United States Patent
Toyosawa et al.

(10) Patent No.: US 7,165,016 B2
(45) Date of Patent: Jan. 16, 2007

(54) SIMULATION APPARATUS, SIMULATION METHOD THEREFOR, AND PROGRAM FOR IMPLEMENTING THE SIMULATION METHOD

(75) Inventors: Eiji Toyosawa, Kawasaki (JP); Tatsuro Kawakami, Yokohama (JP); Kenji Taki, Yokohama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 11/145,379

(22) Filed: Jun. 3, 2005

(65) Prior Publication Data

US 2005/0273299 A1 Dec. 8, 2005

(30) Foreign Application Priority Data

| Jun. 3, 2004 | (JP) | ............................. 2004-166336 |
| Mar. 14, 2005 | (JP) | ............................. 2005-071896 |
| Mar. 14, 2005 | (JP) | ............................. 2005-071897 |

(51) Int. Cl.
G06G 7/48 (2006.01)
G06F 7/60 (2006.01)
G06F 7/38 (2006.01)

(52) U.S. Cl. ............................... 703/6; 703/2; 700/214
(58) Field of Classification Search .................... 703/2, 703/6, 7; 700/214; 399/9, 16, 18, 21
See application file for complete search history.

(56) References Cited

U.S. PATENT DOCUMENTS 6,950,787 B1 * 9/2005 Hashima et al. ................ 703/2

| 2004/0122551 A1 * | 6/2004 | Ogawa et al. ............... 700/214 |
| 2004/0167759 A1 * | 8/2004 | Kawakami ..................... 703/6 |
| 2006/0074613 A1 * | 4/2006 | Oyama .......................... 703/2 |
| 2006/0074615 A1 * | 4/2006 | Sugiyama ...................... 703/6 |

FOREIGN PATENT DOCUMENTS

| JP | 11-116133 A | | 4/1999 | |
| JP | 11-120220 A | * | 4/1999 | .................... 703/2 |
| JP | 11-195052 A | | 7/1999 | |
| JP | 2000-222454 A | * | 8/2000 | .................... 703/2 |
| JP | 2000-331037 A | * | 11/2000 | .................. 399/18 |
| JP | 2005-250184 A | * | 9/2005 | .................... 703/2 |

* cited by examiner

*Primary Examiner*—Willis R. Wolfe, Jr.
(74) *Attorney, Agent, or Firm*—Rossi, Kimms & McDowell LLP

(57) ABSTRACT

A simulation apparatus which is capable of expressing a curling shape of a flexible medium such as a paper sheet in a simple manner, when evaluating functions of a conveying path. The behavior of a flexible medium conveyed in a conveying path is simulated. A display displays at least one component in the conveying path defined in advance on a display screen. A CPU interactively sets a shape of the flexible medium and an amount of curling of the flexible medium, the behavior of which in the conveying path is simulated on the display screen on which the component is displayed by the display.

15 Claims, 39 Drawing Sheets

*FIG. 36A*        *FIG. 36B*
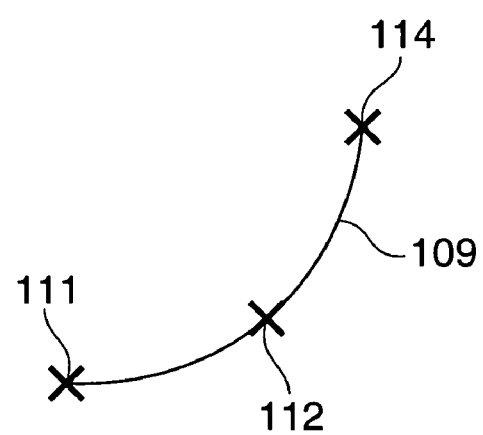
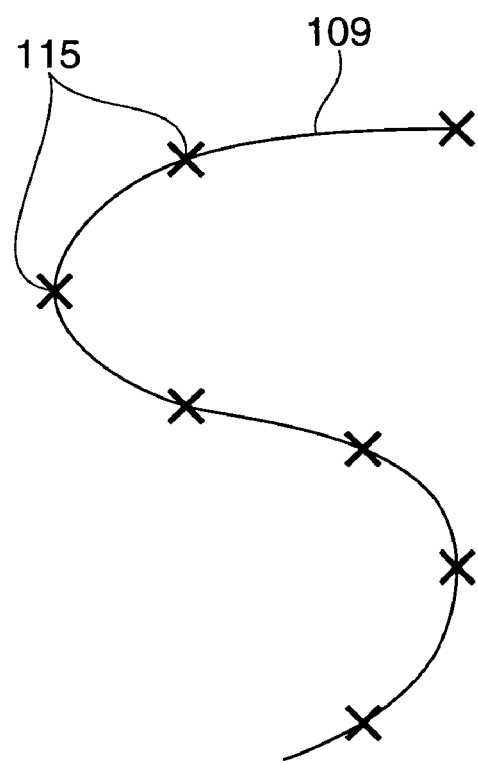

SIMULATION APPARATUS, SIMULATION METHOD THEREFOR, AND PROGRAM FOR IMPLEMENTING THE SIMULATION METHOD

BACKGROUND OF THE INVENTION

1. Field of the Invention

The present invention relates to a simulation apparatus, a simulation method therefor, and a program for implementing the simulation method, and more particularly to a simulation apparatus that simulates the behavior of a flexible medium conveyed in a conveying path, a simulation method therefor, and a program for implementing the simulation method.

2. Description of the Related Art

In designing a conveying path in an image forming apparatus such as a copying machine and a laser printer, study of functions of the image forming apparatus to be designed, required for various conditions before the image forming apparatus is actually manufactured can reduce the man-hours required for manufacturing and testing prototypes, and can reduce the time and cost of the development at the same time. For these purposes, generally, studies are made to achieve optimal design of the conveying path by analyzing the behavior of a sheet conveyed in the conveying path in the image forming apparatus by means of computer simulation.

As a conventional technique used to simulate the behavior of a sheet conveyed in the conveying path, there has been proposed a design support system which defines a flexible medium (sheet) as finite elements using the finite element method to thereby evaluate the conveyance resistance (guide resistance) and contact angle between the flexible medium and guides in the conveying path (refer to Japanese Laid-Open Patent Publications (Kokai) Nos. H11-195052 and H11-116133, for example).

However, the above conventional simulation apparatus has the following problem. Namely, to exactly evaluate the behavior of a sheet conveyed in the conveying path and the guide resistance, it is necessary to take into consideration curling of the flexible medium (sheet). However, in the prior art, for the flexible medium which is expressed as a collection of its mass and spring, the angles between the respective mass points are selected to set the curling. Although the sheet behavior and the guide resistance can be evaluated by expressing the curling shape of the sheet, it requires a large amount of man-hours to set the curling.

SUMMARY OF THE INVENTION

It is an object of the present invention to provide a simulation apparatus, and a simulation method therefor which is capable of expressing a curling shape of a flexible medium such as a paper sheet in a simple manner, when evaluating functions of a conveying path, and a program for implementing the method.

To attain the above object, in a first aspect of the present invention, there is provided a simulation apparatus that simulates a behavior of a flexible medium conveyed in a conveying path, comprising a display device that displays at least one component in the conveying path defined in advance on a display screen, and a flexible medium setting device that interactively sets a shape of the flexible medium and an amount of curling of the flexible medium, the behavior of which in the conveying path is simulated on the display screen on which the component is displayed by the display device.

Preferably, the flexible medium setting device expresses the flexible medium as an elastic body model by dividing the flexible medium into a plurality of rigid body elements having mass, and connecting the rigid body elements by springs, the flexible medium setting device designating two of the plurality of rigid body elements to set a curled portion of the flexible medium.

Preferably, the simulation apparatus further comprises a simulation device that simulates the behavior of the flexible medium set by the flexible medium setting device, and wherein when the shape of the flexible medium set by the flexible medium setting device is a straight shape, the simulation device causes a restoring force to act upon a portion of the flexible medium for which the shape of the flexible medium has been set by the flexible medium setting device so as to restore the curling shape of the flexible medium, upon start of the simulation.

Preferably, the simulation apparatus further comprises a simulation device that simulates the behavior of the flexible medium set by the flexible medium setting device, and wherein when the shape of the flexible medium set by the flexible medium setting device includes a curved shape, the simulation device causes a restoring force to act upon a curled portion of the flexible medium for which the shape of the flexible medium has been set by the flexible medium setting device so as to restore the curling shape of the flexible medium and causes a restoring force to act upon a portion of the flexible medium other than the curled portion so as to restore a straight shape of the flexible medium, upon start of the simulation.

Preferably, the display device displays a window for setting a length and a height of a curled portion of the flexible medium as the amount of curling of the flexible medium, according to designation of an end point of the flexible medium displayed by the display device.

To attain the above object, in a second aspect of the present invention, there is provided a simulation method for a simulation apparatus that simulates a behavior of a flexible medium conveyed in a conveying path, comprising a display step of displaying at least one component in the conveying path defined in advance on a display screen, a flexible medium shape step of setting a shape of the flexible medium, the behavior of which in the conveying path is simulated on the display screen on which the component displayed in the display step, and a flexible medium curling amount step of interactively setting an amount of curling of the flexible medium the shape of which has been set in the flexible medium shape setting step.

Preferably, in the flexible medium amount setting step, the flexible medium is divided into a plurality of rigid body elements having mass, and the rigid body elements are connected by springs, to thereby express the flexible medium as an elastic body model, the flexible medium setting device, and two of the plurality of rigid body elements are designated to set a curled portion of the flexible medium.

Preferably, the simulation method further comprises a simulation step of simulating the behavior of the flexible medium set in the flexible medium shape setting step and the flexible medium curling amount setting step, and wherein when the shape of the flexible medium set in the flexible medium shape setting step is a straight shape, in the simulation step, a restoring force is caused to act upon a portion of the flexible medium for which the shape of the flexible medium has been set in the flexible medium shape setting step so as to restore the curling shape of the flexible medium, upon start of the simulation.

Preferably, the simulation method further comprises a simulation step of simulating the behavior of the flexible medium set in the flexible medium shape setting step and the flexible medium curling amount setting step, and wherein when the shape of the flexible medium set in the flexible medium shape setting step includes a curved shape, in the simulation step, a restoring force is caused to act upon a curled portion of the flexible medium for which the shape of the flexible medium has been set in the flexible medium shape setting step so as to restore the curling shape of the flexible medium and causes a restoring force to act upon a portion of the flexible medium other than the curled portion so as to restore a straight shape of the flexible medium, upon start of the simulation.

Preferably, in the display step, a window is displayed for setting a length and a height of a curled portion of the flexible medium as the amount of curling of the flexible medium, according to designation of an end point of the flexible medium displayed in the display step.

To attain the above object, in a third aspect of the present invention, there is provided a computer-readable simulation program for causing a computer to execute a simulation method for a simulation apparatus that simulates a behavior of a flexible medium conveyed in a conveying path, the simulation method comprising a display step of displaying at least one component in the conveying path defined in advance on a display screen, a flexible medium shape step of setting a shape of the flexible medium, the behavior of which in the conveying path is simulated on the display screen on which the component displayed in the display step, and a flexible medium curling amount step of interactively setting an amount of curling of the flexible medium the shape of which has been set in the flexible medium shape setting step.

The above and other objects, features, and advantages of the invention will become more apparent from the following detailed description taken in conjunction with the accompanying drawings.

BRIEF DESCRIPTION OF THE DRAWINGS

FIGS. 36A and 36B are views showing a screen for setting the shape of the flexible medium to a shape bent in an arc shape or spline shape by the user;

DETAILED DESCRIPTION OF THE PREFERRED EMBODIMENTS

The present invention will now be described in detail with reference to the drawings showing a preferred embodiment thereof. A simulation apparatus according to the present embodiment is applied to a design support system.

Figure 1:
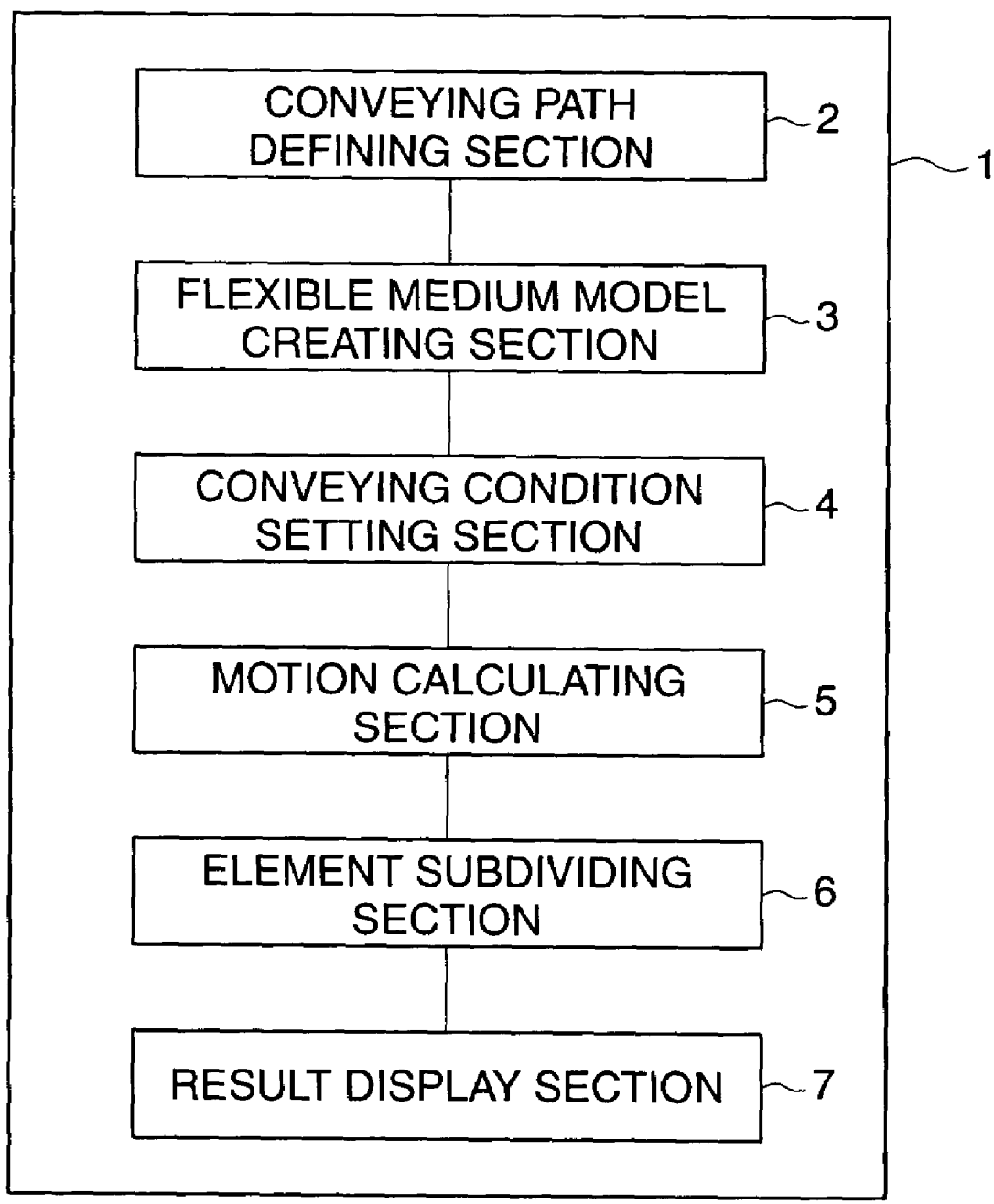
FIG. 1 is a block diagram showing the functional construction of a design support system according to an embodiment of the present invention.

FIG. 1 is a block diagram showing the functional construction of the design support system according to the present embodiment. The design support system 1 is comprised of a conveying path defining section 2, a flexible medium model creating section 3, a conveying condition setting section 4, a motion calculating section 5, an element subdividing section 6, and a result display section 7. A detailed description will later be given of the respective sections.

Figure 2:
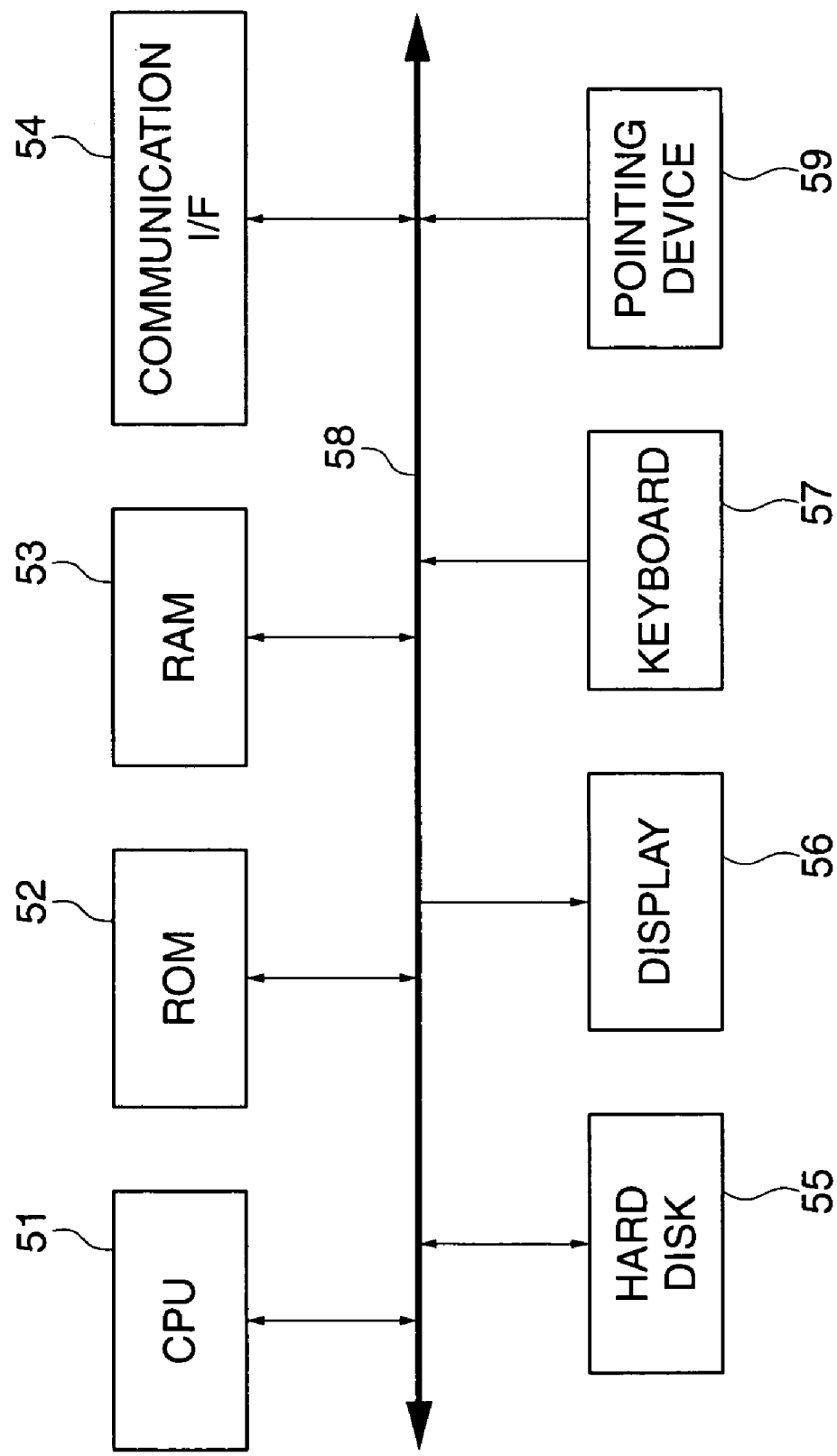
FIG. 2 is a block diagram showing the hardware configuration that realizes the design support system shown in FIG. 1.

FIG. 2 is a block diagram showing the hardware configuration that realizes the design support system 1 shown in FIG. 1. The hardware is configured such that a well-known CPU 51, a ROM 52, a RAM 53, a communication interface 54, a hard disk 55, a display 56, a keyboard 57, and a pointing device 59 are connected with each other via a bus 58. The functions of the above respective sections of the design support system 1 are realized by the CPU 51 executing a design support program stored in the hard disk 55. A mouse and a touch panel are used as the pointing device 59.

Figure 3:
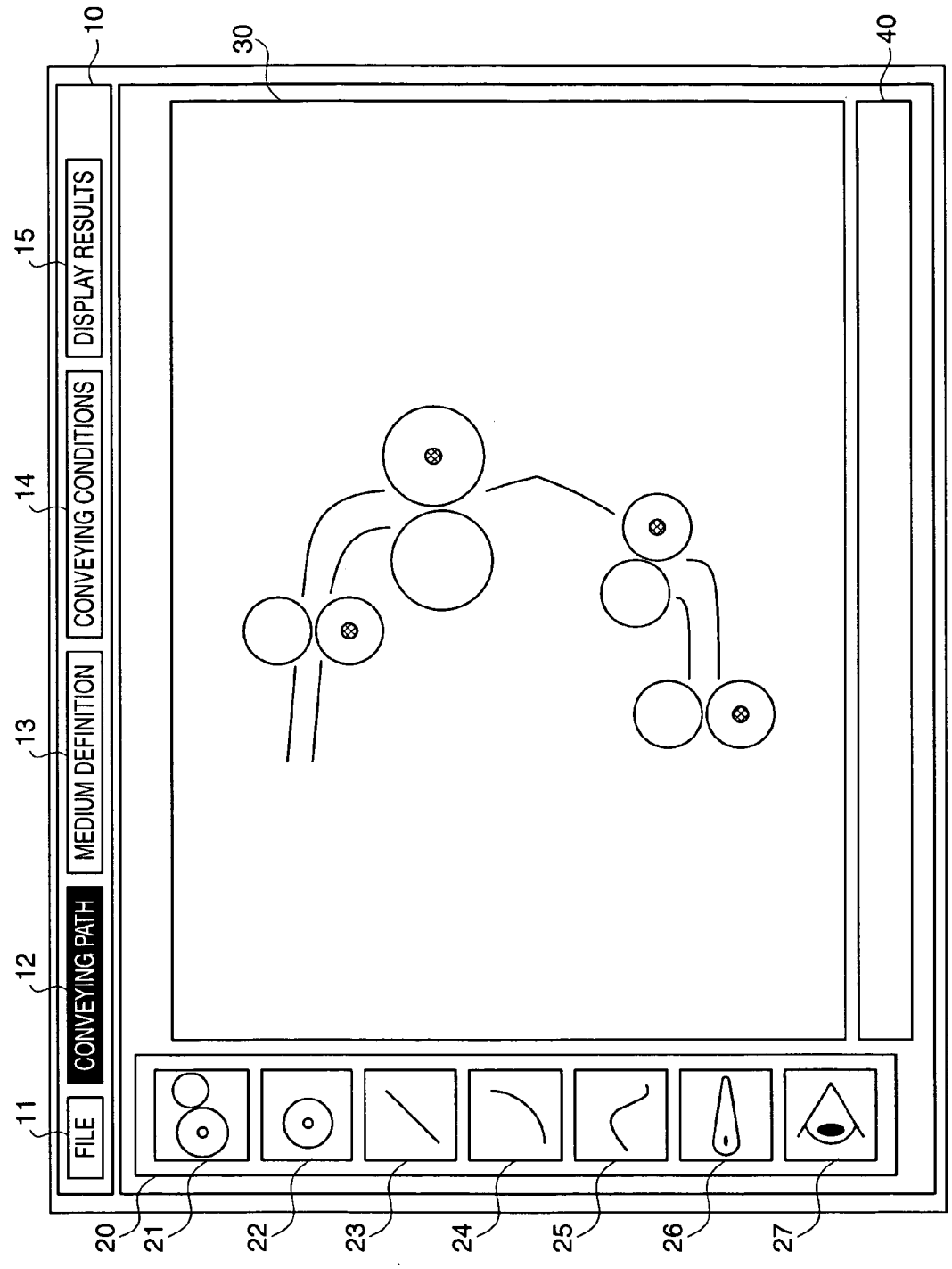
FIG. 3 is a view showing a screen shown on a display appearing in FIG. 2, and used for carrying out processing by a conveying path defining section appearing in FIG. 1.

FIG. 3 is a view showing a screen shown on the display 56 appearing in FIG. 2, and used for carrying out processing by the conveying path defining section 2 appearing in FIG. 1. On this screen are displayed a menu bar 10 that contains various types of buttons used to execute main functions, a sub-configuration menu 20 that contains various types of buttons used to carry out sub-functions corresponding to the respective main functions, a graphic screen 30 that shows, for example, a defined conveying path, and calculation results, and a command field 40 that is used, for example, for output of messages, and input of numeric data. In the present embodiment, the menu bar 10 includes a file button 11, a conveying path button 12 that is used to carry out processing by the conveying path defining section 2, a medium defining button 13 that is used to carry out processing by the flexible medium model creating section 3, a conveying condition setting button 14 that is used to carry out processing by the conveying condition setting section 4, and a result display button 15 that is used to carry out processing by the result display section 7.

Figure 4:
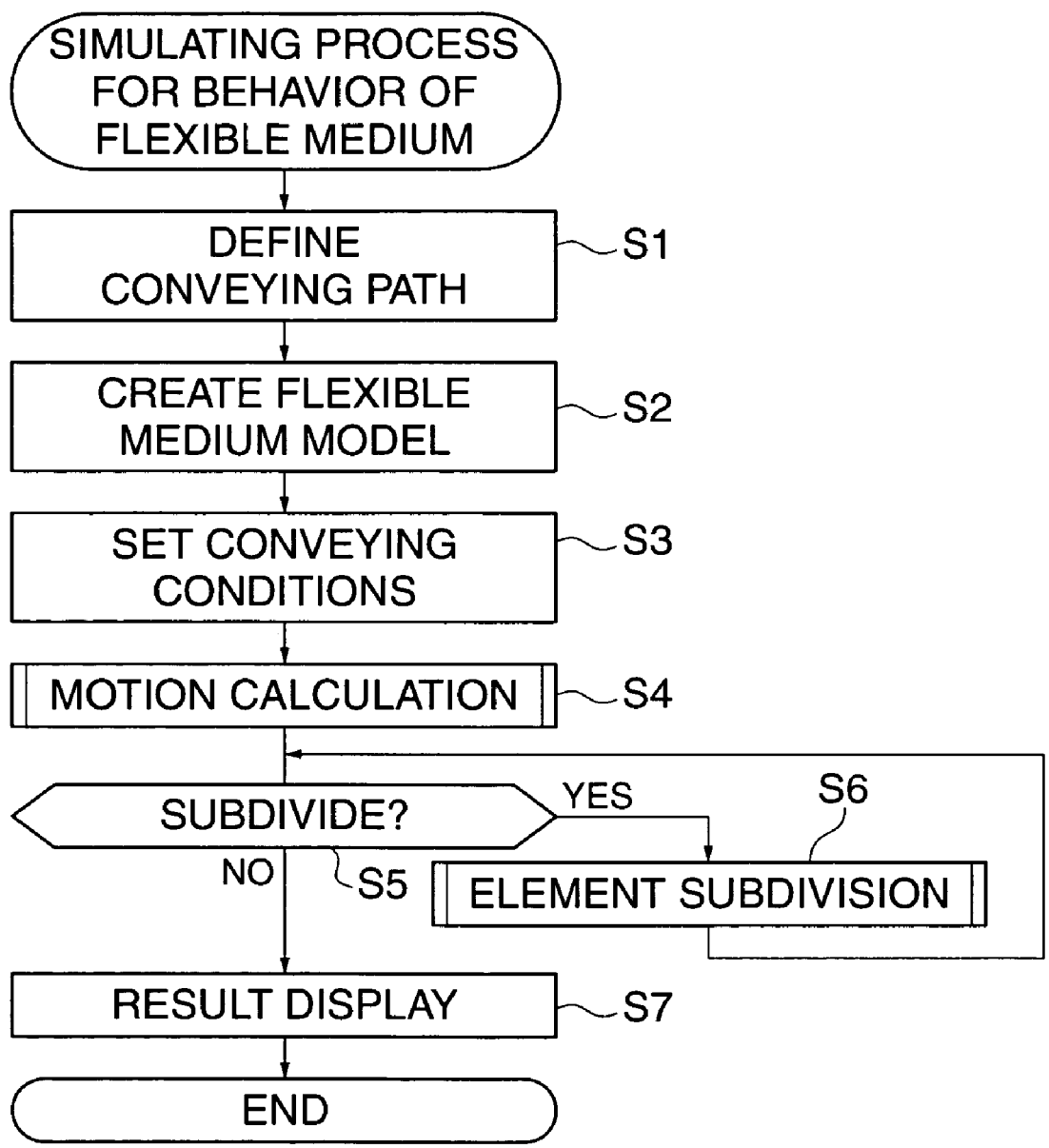
FIG. 4 is a flowchart showing the procedure of a main process for simulating the behavior of a flexible medium carried out by the design support system shown in FIG. 1.

FIG. 4 is a flowchart showing the procedure of a main process for simulating the behavior of a flexible medium carried out by the design support system shown in FIG. 1. A program for executing this process is stored in the storage apparatus (hard disk 55) as a design support program, and is executed by the CPU 51. The functions of the above respective sections constituting the design support system 1 are realized by the CPU 51 executing the design support program stored in the hard disk 55.

First, the CPU 51 causes the conveying path defining section 2 to define a conveying path (step S1). Then, the CPU 51 causes the flexible medium model creating section 3 to express a flexible medium as an elastic body by dividing the flexible medium into a plurality of mass points, and then connecting the respective mass points with each other by springs (step S2). Conveying conditions are then set by the conveying condition setting section 4 (step S3). Then, motions of the flexible medium are calculated in time series by the motion calculating section 5 based on the set conveying conditions (step S4).

The CPU 51 evaluates the bending moment of the flexible medium based on the calculation result, and determines whether to subdivide the flexible medium or not based on the evaluation result (step S5). If the flexible medium is to be subdivided, the CPU 51 causes the element subdividing section 6 to subdivide the flexible medium, thereby increasing the number of divisions into mass points (step S6). The CPU 51 returns to the step S5. On the other hand, if the flexible medium is not to be subdivided, the CPU 51 causes the result display section 7 to display the behavior of the flexible medium on the screen of the display 56 (step S7). Then, the present process is terminated.

A description will now be given of the processing by the respective sections.

[Conveying Path Defining Section]

If a user clicks the conveying path button 12 in the menu bar 10 to define a conveying path, the sub-configuration menu 20 including various types of sub-functions of the conveying path defining section 2 is displayed on the screen (refer to FIG. 3).

In FIG. 3, the sub-configuration menu 20 contains a roller pair defining button 21 that defines a pair of conveying rollers, a roller defining button 22 that defines a single roller, a straight guide defining button 23 that defines a straight conveying guide, an arc guide defining button 24 that defines an arc conveying guide, a spline guide defining button 25 that defines a conveying guide based on a spline curve, a flapper defining button 26 that defines a flapper (point) used to branch the path along which a flexible medium is conveyed, and a sensor defining button 27 that defines a sensor used to detect whether or not the flexible medium is present at a predetermined position in the conveying path.

These buttons used to define the respective components are provided as corresponding to component parts constituting a conveying path of an actual copying machine or printer. First, if the user uses the sub-configuration menu 20 to define the respective component parts, graphics corresponding to these components are displayed at specified positions on the graphic screen 30. If the definition of the conveying path by the conveying path defining section 2 is completed, the CPU 51 proceeds to the processing by the flexible medium model creating section 3.

[Flexible Medium Model Creating Section]

Figure 5:
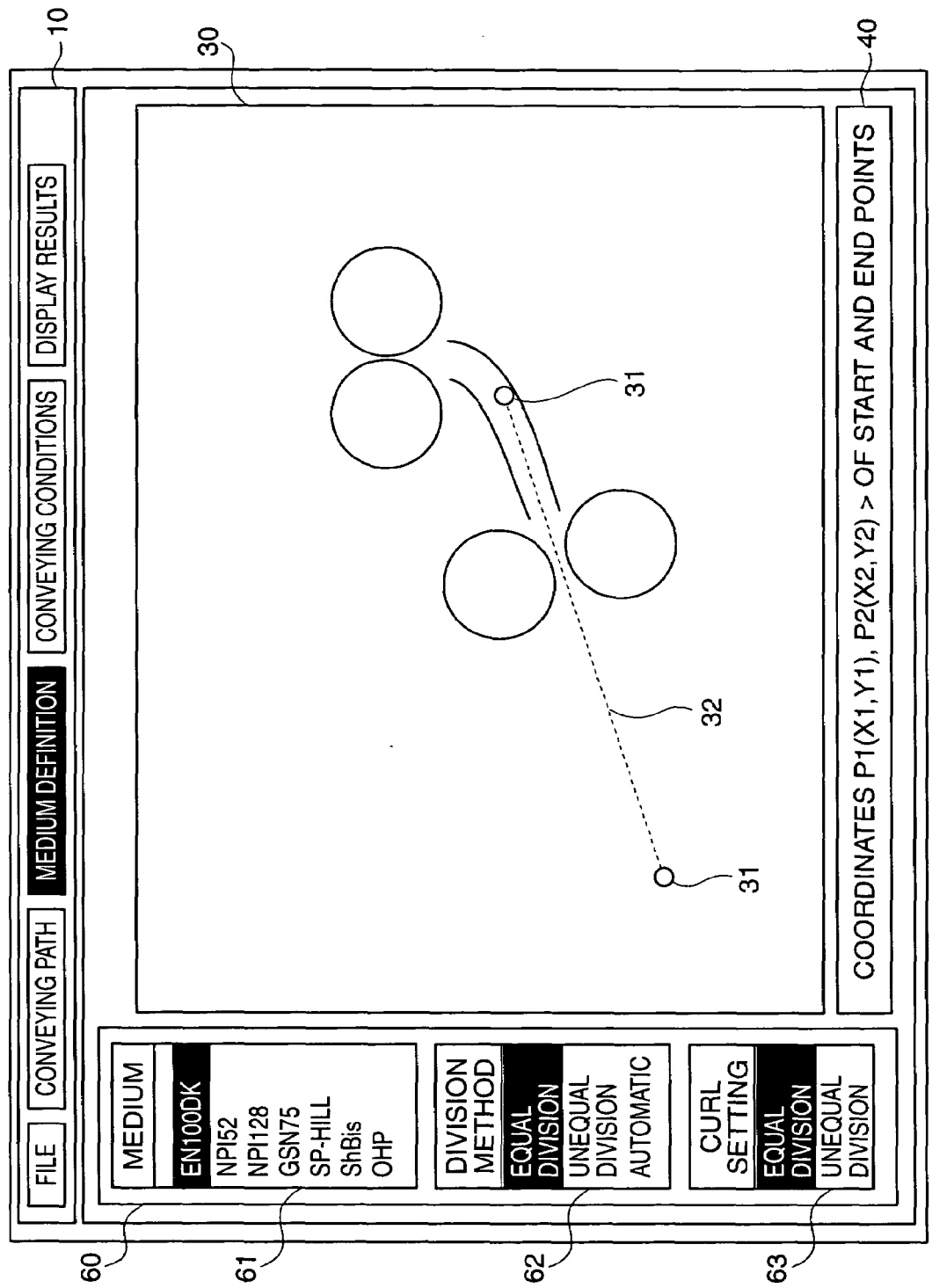
FIG. 5 is a view showing a screen on which are reflected sub-functions used for processing carried out by a flexible medium model creating section appearing in FIG. 1.

FIG. 5 is a view showing a screen on which are reflected sub-functions used for processing carried out by the flexible medium model creating section 3 appearing in FIG. 1. If the medium defining button 13 in the menu bar 10 is clicked, a sub-configuration menu 60 including various types of sub-functions of the flexible medium model creating section 3 is displayed on the screen.

In the sub configuration menu 80 are displayed a medium type selecting screen 61, a division method selecting screen 82, and a curl setting selecting screen 83. Typical sheet type names are registered for the medium type selecting screen 61 in advance far selection of the type of the flexible medium. The division method selecting screen 82 enables selection of a division method used to divide the flexible medium. The curl setting selecting screen 83 enables selection of a devision method within an area for which curling is to be set.

First, a message prompting input of coordinates of the both ends of the flexible medium is displayed in a command field 40 to specify the position of the flexible medium in the conveying path. The coordinates may be input as numerical values via the command field 40, or may be directly specified on the graphic screen 30 by means of the pointing device 59.

When the coordinates of the both ends of the flexible medium have been specified, a line (broken line in FIG. 5) 32 which connects between the both ends 31 is drawn on the graphic screen 30 to enable-checking how the flexible medium is placed in the conveying path. A message prompting input of a condition for the number of divisions n used to divide the flexible medium represented as the line 32 into a plurality of discrete spring-mass systems then displayed in the command field 40.

Figure 6:
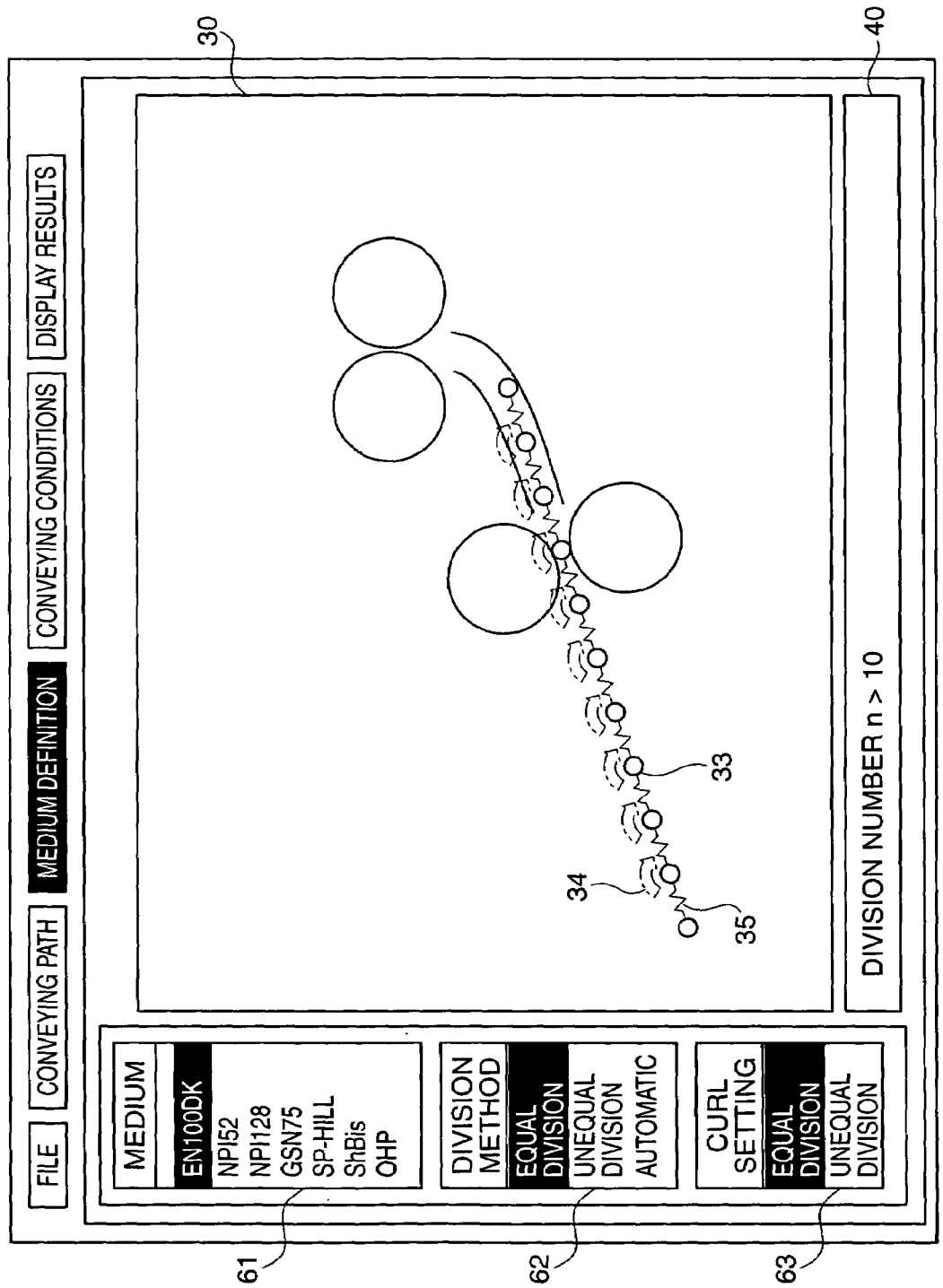
FIG. 6 is a view showing a screen for dividing the flexible medium into a plurality of discrete spring-mass systems by the flexible medium model creating section.

FIG. 6 is a view showing a screen for dividing the flexible medium into the plurality of discrete spring-mass systems by the flexible medium model creating section 3. In the present embodiment, a condition specifying that the number of divisions n is larger than ten is input to the command field 40. As a result of the input of the condition for the division number, mass points 33 are arranged at positions at which the line 32 (FIG. 5) is divided into ten lines at equal intervals, and at the same time a model in which the respective mass points are connected with each other by rotational springs 34 and translational springs 35 is shown on the graphic screen 30. The rotational springs 34 which connect the mass points with each other represent flexural rigidity when the flexible medium is regarded as an elastic body. The translational springs 35 which connect the mass points with each other represent tensile rigidity. A mass point 133, referred to later, represents a mass point at the leading end of the flexible medium, and may be shown in a display form different from that of the other mass points 33.

When the above operations are completed, the flexible medium is defined as a model of an elastic body which reacts to a flexural force and a tensile force in the design support system 1. At the same time, the type of the flexible medium to be calculated is selected from the medium type selecting screen 61 (FIG. 6) by clicking the mouse or the like.

Parameters required for calculation of the motion of the flexible medium in the conveying path includes information on the Young's modulus, density, and thickness of the flexible medium, and these parameters are assigned to the sheet types shown on the medium type selecting screen 61 in the form of a database. In FIG. 5, it is seen that "EN100DK" which is a typical type of recycled paper is selected as the medium type. As a result of this selection, there are selected a Young's modulus value of 5409 MPa, a density value of $6.8 \times 10^{-7}$ kg/mm$^3$, and a sheet thickness value of 0.0951 mm from the database within the system.

[Equal Division]

Figure 7:
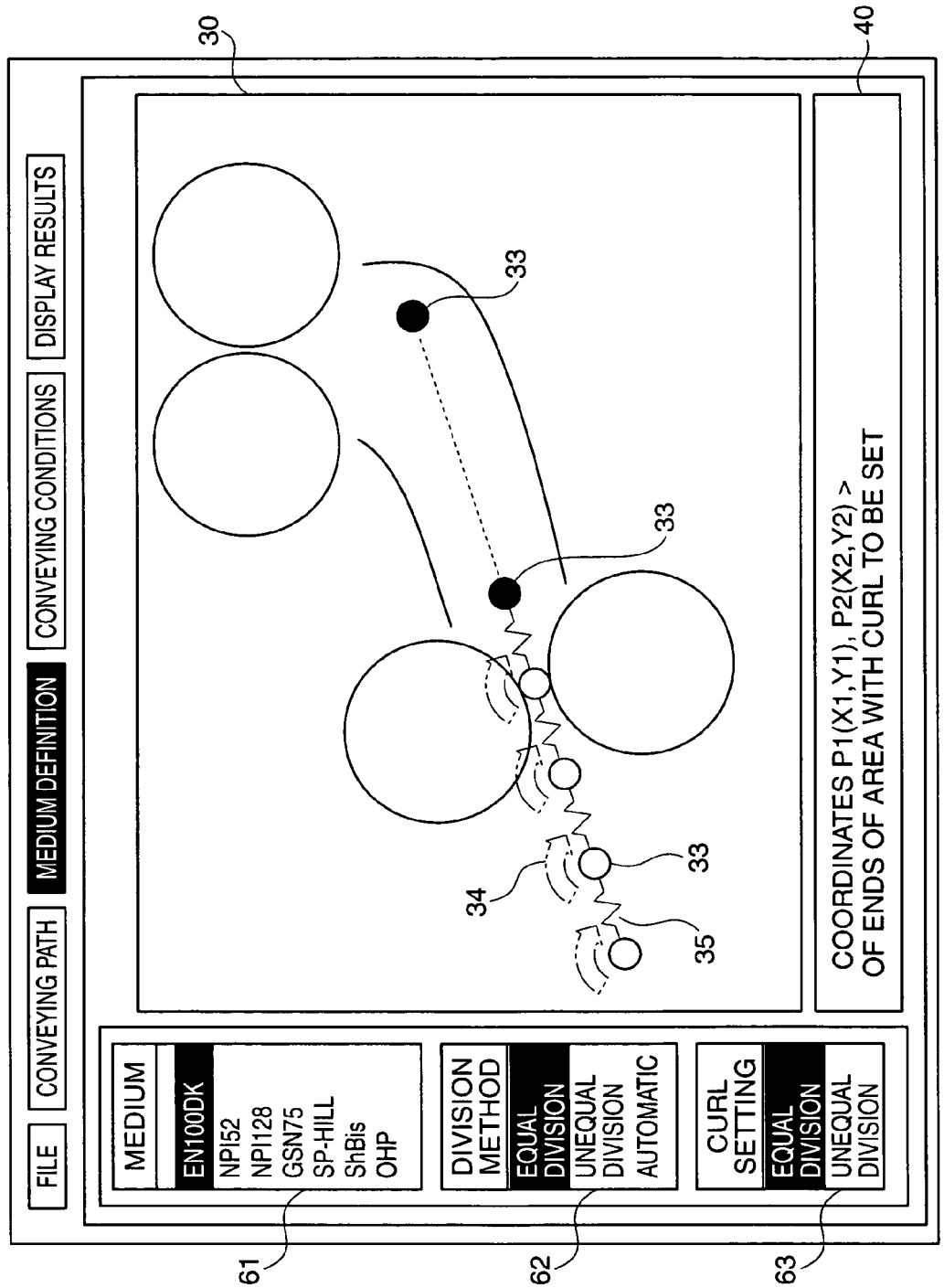
FIG. 7 is a view showing a screen for setting curling of the flexible medium by means of equal division by the flexible medium mode creating section.

FIG. 7 is a view showing a screen for setting curling of the flexible medium by means of equal division by the flexible medium model creating section 3 appearing in FIG. 1. If "Equal division" is selected on the curl setting selecting screen 63, a message prompting input of an area for which curling is to be set is displayed in the command field 40. To input the area for which curling is to be set, the user directly designates two mass points at the both ends of the area for which curling is to be set from the mass points 33 displayed on the graphic screen 30 by means of the pointing device 59, or inputs numerical values of the coordinates (P1, P2) of these two mass points to the command field 40. When the two mass points (two black dots in FIG. 7) are designated, mass points, rotational springs, and translational springs generated between the selected two mass points are once deleted.

Figure 8:
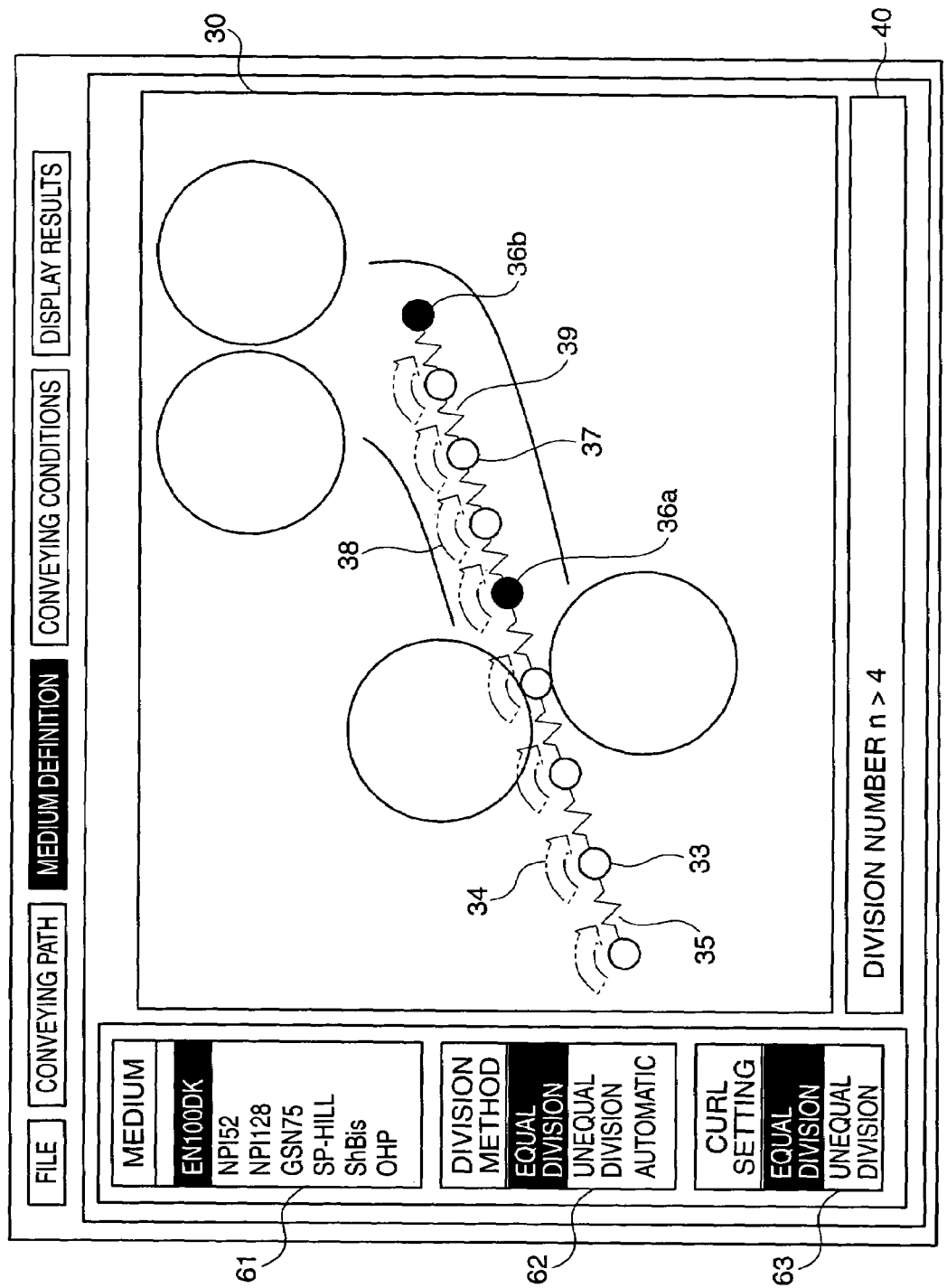
FIG. 8 is a view showing a screen for dividing an area between two mass points selected by a user into a plurality of discrete spring-mass systems by the flexible medium mode creating section.

FIG. 8 is a view showing a screen for dividing the area between the two mass points selected by the user into a plurality of discrete spring-mass systems by the flexible medium model creating section 3 appearing in FIG. 1. On this screen, a message prompting input of a condition for the number of divisions n used to divide the area between the selected two mass points 36a and 36b into a plurality of discrete spring-mass systems is displayed in the command field 40. In the present embodiment, a condition specifying that the number of divisions n is larger than 4 is input to the command field 40. As a result of this input, three mass points 37 are arranged at positions at which the area between the two mass points 36a and 36b is divided into equal sections, and at the same time a model in which the respective mass points are connected with each other by rotational springs 38 and translational springs 39 is shown on the graphic screen 30.

Figure 9:
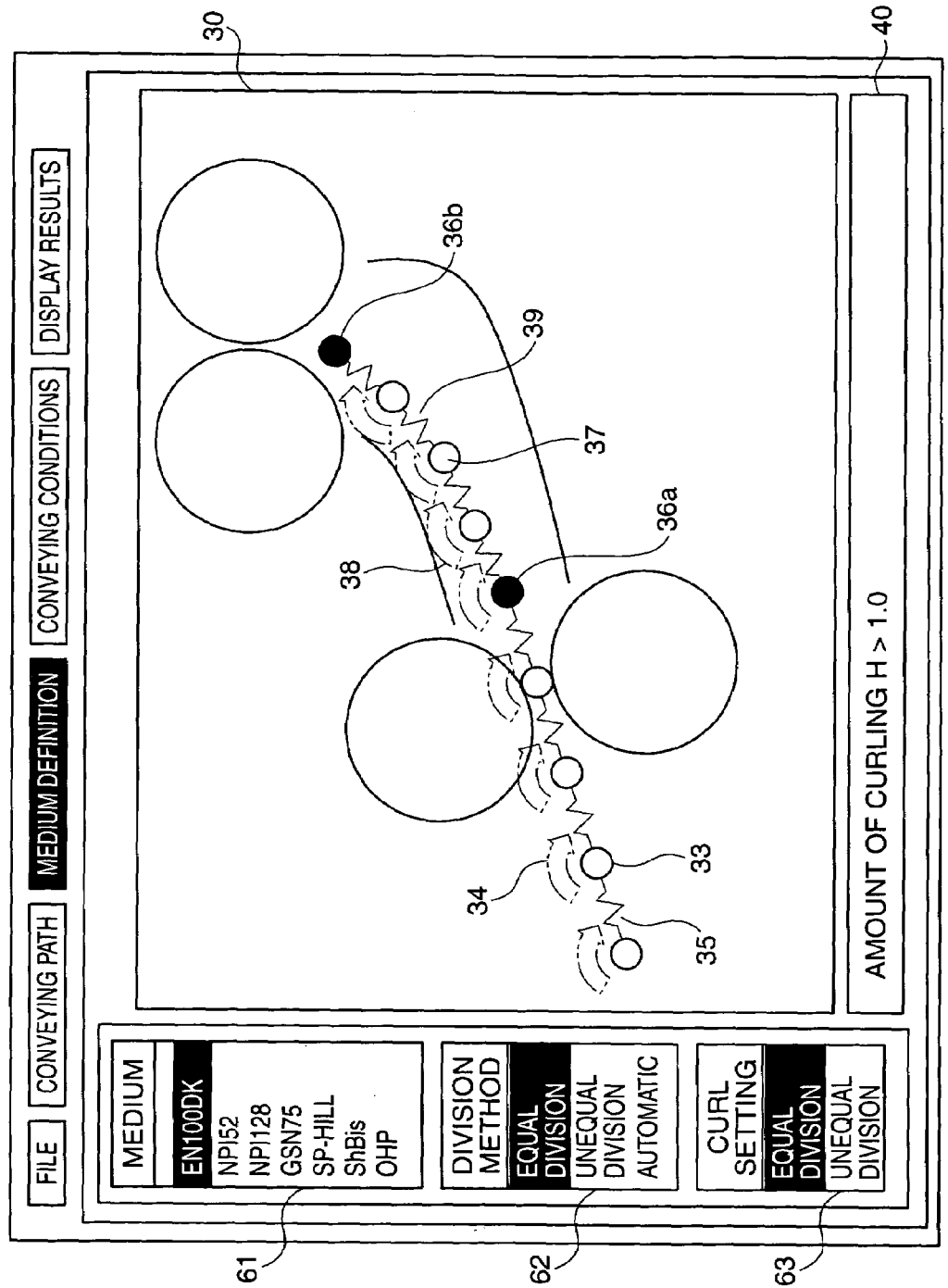
FIG. 9 is a view showing a screen for setting the amount of curling by the flexible medium mode creating section.

FIG. 9 is a view showing a screen for setting the amount of curling by the flexible medium model creating section 3 appearing in FIG. 1. A message prompting input of the amount of curling (the difference between uppermost and lowermost portions; hereinafter referred to as "the height") is displayed in the command field 40. In the present embodiment, a condition specifying that the amount of curling "h" is larger than 1.0 is input to the command field 40. As a result of this input, mass points 36a, 37, and 36b are automatically rearranged in the displayed area in which curling has been set, and the rotational springs 38 and translational springs 39 are automatically connected between the respective mass points on the graphic screen 30.

Figure 10:
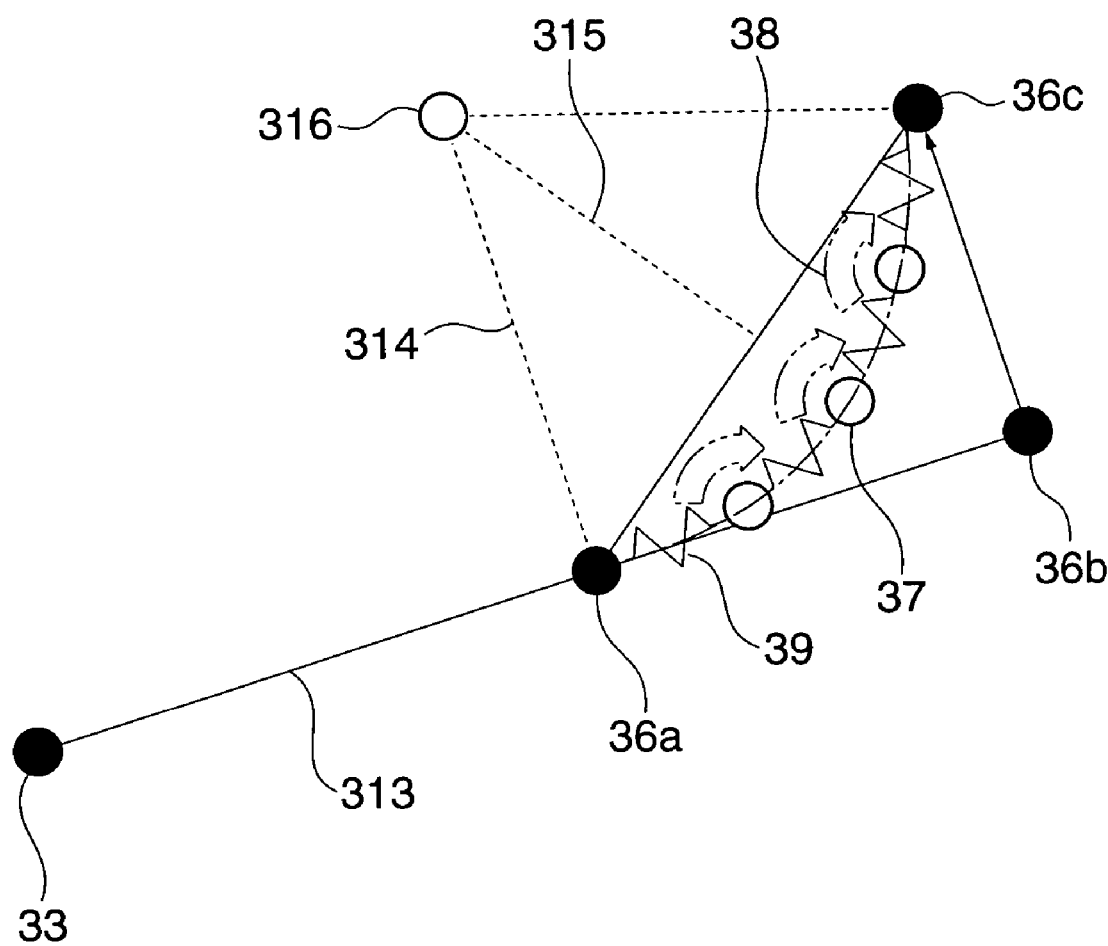
FIG. 10 is a view showing a method of obtaining the coordinate values of respective mass points arranged in an area for which curling has been set, according to the present embodiment.

FIG. 10 is a view showing a method of obtaining the coordinate values of the respective mass points arranged in the area in which curling has been set, according to the present embodiment. In FIG. 10, a mass point 36c is placed at a point displaced by the amount of curling "h" from the mass point 36b in a direction perpendicular to a line 313 connecting between the mass point 33 at an end of the area in which curling is not set, and the mass point 36a at the border between the area in which curling is not set and the area in which curling is set, the mass point 36b being at an end of the area in which curling is sets which is opposite to the above border. A perpendicular line 314 passing through the mass point 36a is then drawn in the direction perpendicular to the line 313.

A perpendicular bisector 315 is then drawn with respect to a line connecting between the mass points 36a and 36c.

Then, the mass points 37 obtained according to the number of divisions n are arranged at equal intervals along the circumference of a circle with its center being the intersection 316 of the perpendicular line 314 and the perpendicular bisector 315, passing through the mass points 36a and 36c. Further, the rotational springs 38 and the translational springs 39 are automatically arranged to connect between the arranged mass points.

Although in the present embodiment, the shape of curling is set in advance according to a circle of a predetermined size, the user may set the shape of curling. In this case, the setting of the shape of curling by the user is carried out as described below.

When the screen shown in FIG. 6 is displayed, the end 133 of the shape of curling the user wants to set is selected by a click of the pointing device 59, for example.

Figure 29:
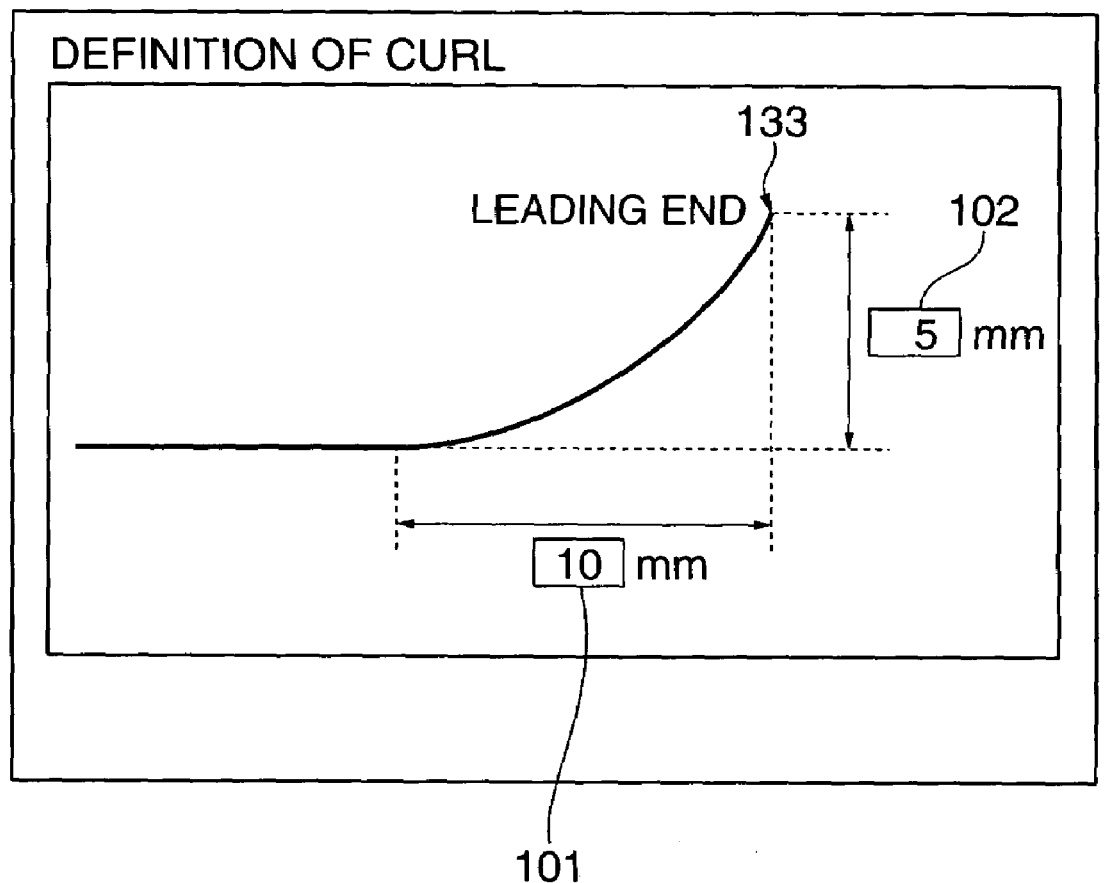
FIG. 29 is a view showing a screen for setting a curling shape by the user.

If the end 133 is clicked, the flexible medium model creating section 3 displays a curling defining window shown in FIG. 29. On the window shown in FIG. 29, there are arranged a box 101 for inputting a horizontal distance from the end 133, and a box 102 for inputting the height of the curled portion. The curling shape is determined by numerical values input to the boxes 101 and 102. In FIG. 29, for example, 10 mm and 5 mm have been input as the horizontal distance from the end 133 and the height of the curled portion, respectively.

Figure 30:
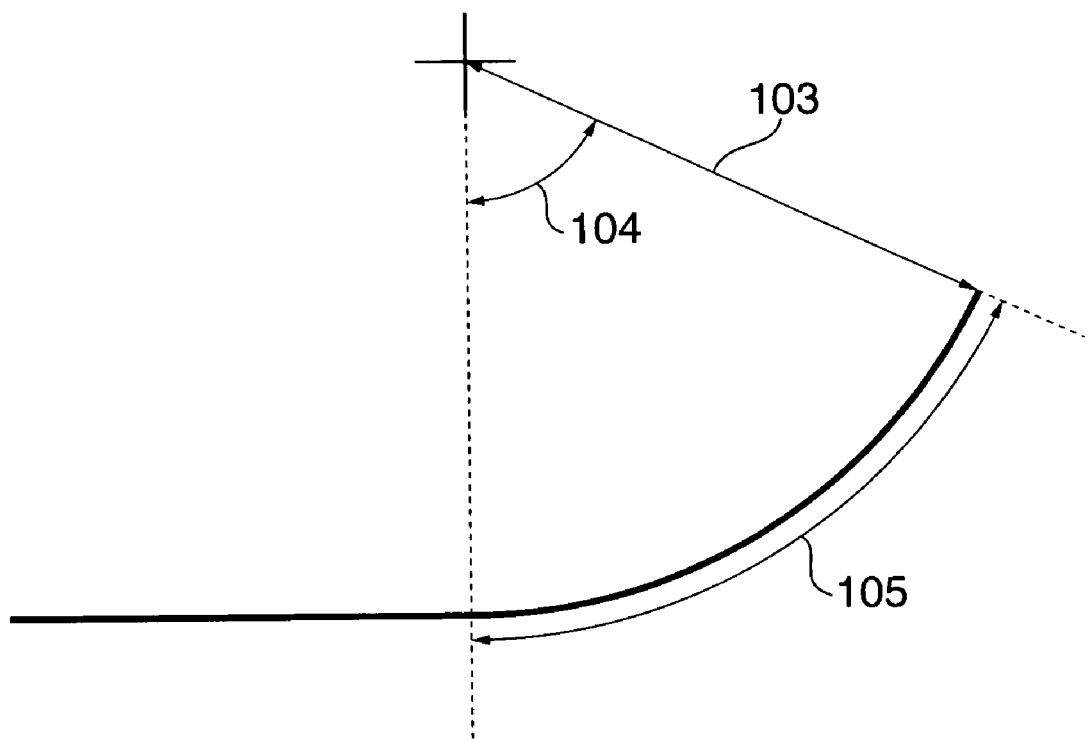
FIG. 30 is a view useful in explaining processing for geometrically calculating the curling shape set by the user in the screen of FIG. 29.

Namely, the shape of curling of the flexible medium at the end 133 is regarded as an arc tangent to the straight portion of the flexible medium as shown in FIG. 30. If the user inputs numerical values for the horizontal distance from the end 133 and the height, the flexible medium model creating section 3 geometrically calculates the radius 103, the central angle 104, and the length 105 of the arc to determine the curling shape.

Figure 31:
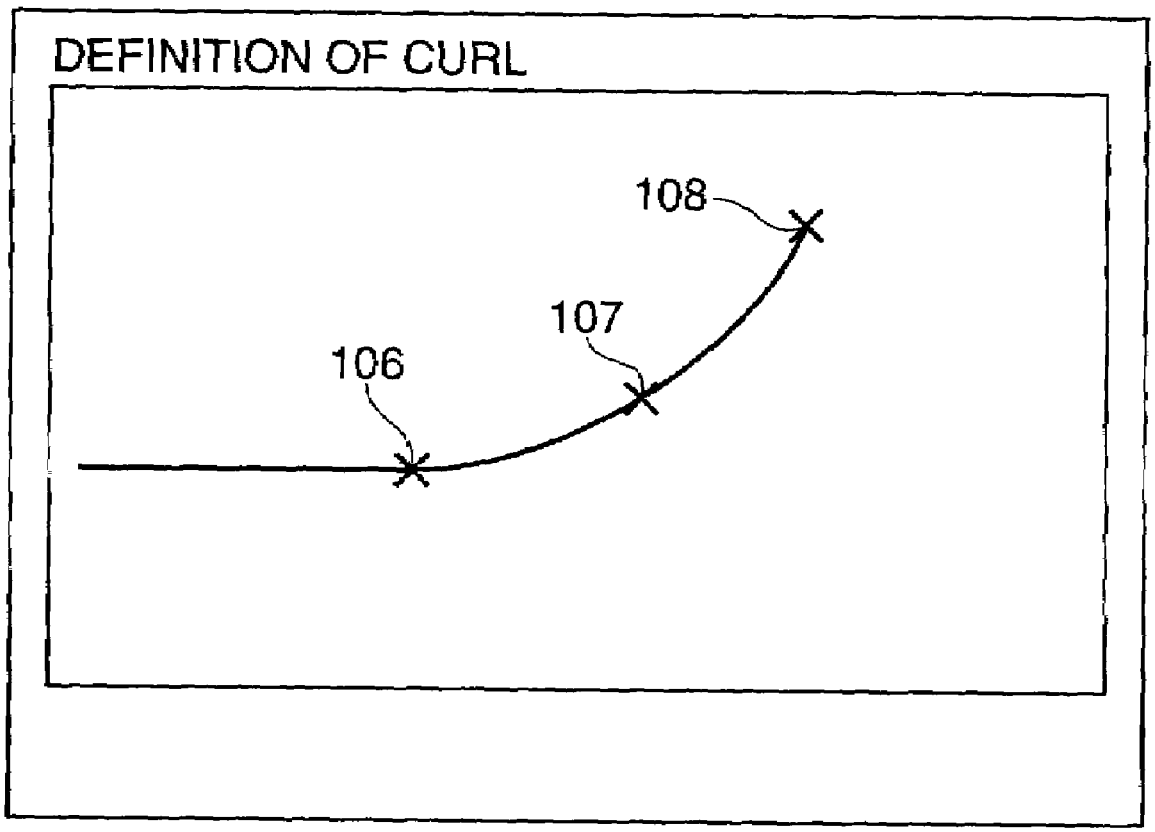
FIG. 31 is a view showing a variation of the screen for setting the curling shape by the user.

FIG. 31 is a view showing a variation of the screen for setting the curling shape by the user.

In the screen of FIG. 31, a leading end 106 of the straight portion, an intermediate point 107, and a leading end 108 of the curled portion of the flexible medium is picked in this order by the user. Thus, the curling shape as the arc passing through the three points may be set by the user.

Figure 32:
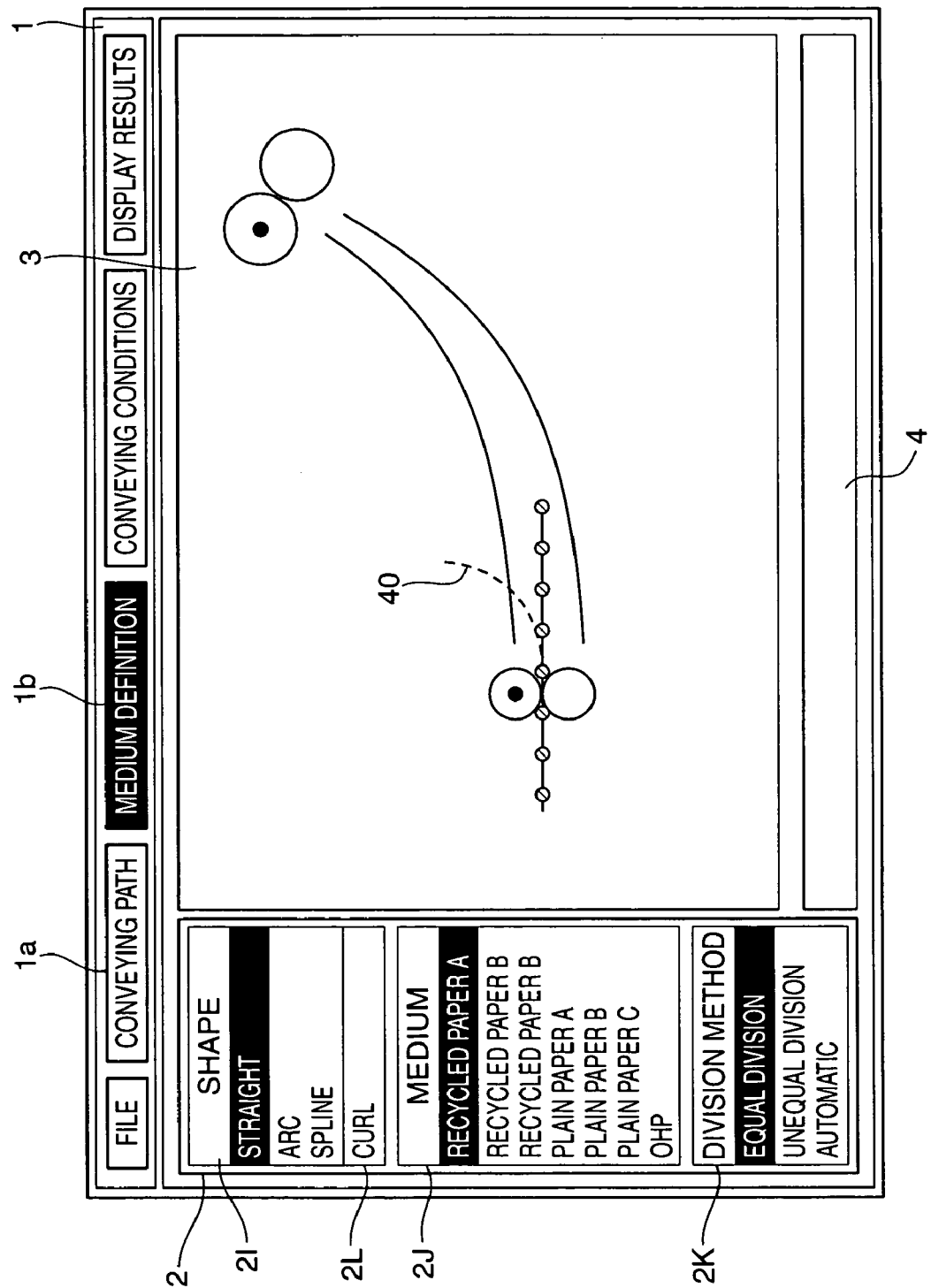
FIG. 32 is a view showing a screen displayed after the curling shape is set by the user.

FIG. 32 is a view showing a screen displayed after the curling shape is set by the user.

As shown in FIG. 32, the end of a set curled portion 40 is drawn differently from the portion without the set curled portion 40. The curled portion 40 may be defined within the conveying path narrower than the height of the curled portion 40 as illustrated in FIG. 32, the curled portion 40 is thus drawn by a virtual line (broken line) before a motion calculating process (process for calculating the motion of the flexible medium in the conveying path), hereinafter referred to, is started, and does not interfere with conveying guides and rollers.

In this way, the shape of the curled portion is determined by the input of the numerical values or the like, and is then drawn by a virtual line, for example, before the motion calculating process is started. Restoring forces are generated so that the shape of the curled portion appears after the motion calculating process is started as described later.

The means for distinguishing the end of the set curled portion from the end of a portion not set as the curled portion is not limited to drawing by a virtual line, but the end of the set curled portion may be marked or shown in a different color.

Figure 33:
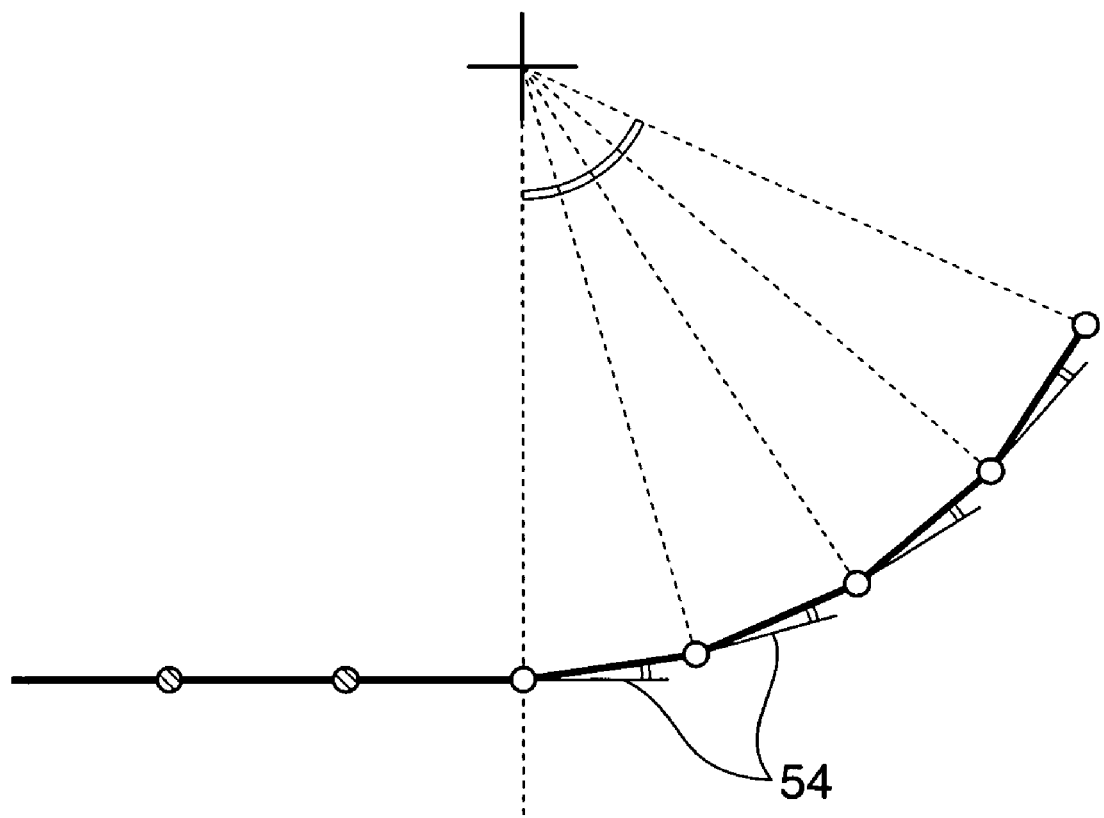
FIG. 33 is a view useful in explaining processing for dividing the curled portion whose shape has been set by the user in FIGS. 30 and 31.

FIG. 33 is a view useful in explaining processing for dividing the curled portion whose shape has been set as above.

As shown in FIG. 33, when the curled portion is divided (the curled portion is divided into four equal divisions in the example of FIG. 33), an angle 54 which is an angle formed between respective adjacent ones of rigid body elements corresponding to the curled portion, according to the number of divisions and the shape of the curled portion determined by the horizontal distance from the end and the height. On the other hand, the shape of the portion other than the defined curled portion is straight, and the angle formed between respective adjacent ones of rigid body elements corresponding to the straight portion is thus uniformly 0°.

These angles formed between all the rigid body elements are stored in the RAM 53 as reference angles used to calculate the restoring forces, namely, angles when the restoring forces are zero. When the motion calculating process is started, the flexible medium defined as having an arbitrary shape generates restoring forces which act to restore the angles formed between the respective adjacent rigid body elements to the reference angles.

After the curled portion is defined as described above, the motion calculation is carried out. As a result of the motion calculation, the restoring forces are generated by the curled portion according to the set curling shape thereof such that the restoring forces become zero with the shape of the set curled portion as described above with reference to FIG. 33, whereby the flexible medium assumes the defined shape of the curled portion. The portion for which no curling is set is regarded as a straight portion, and generates restoring forces such that the restoring forces become zero with the shape being straight, resulting in a behavior of returning to the straight shape.

Figure 34:
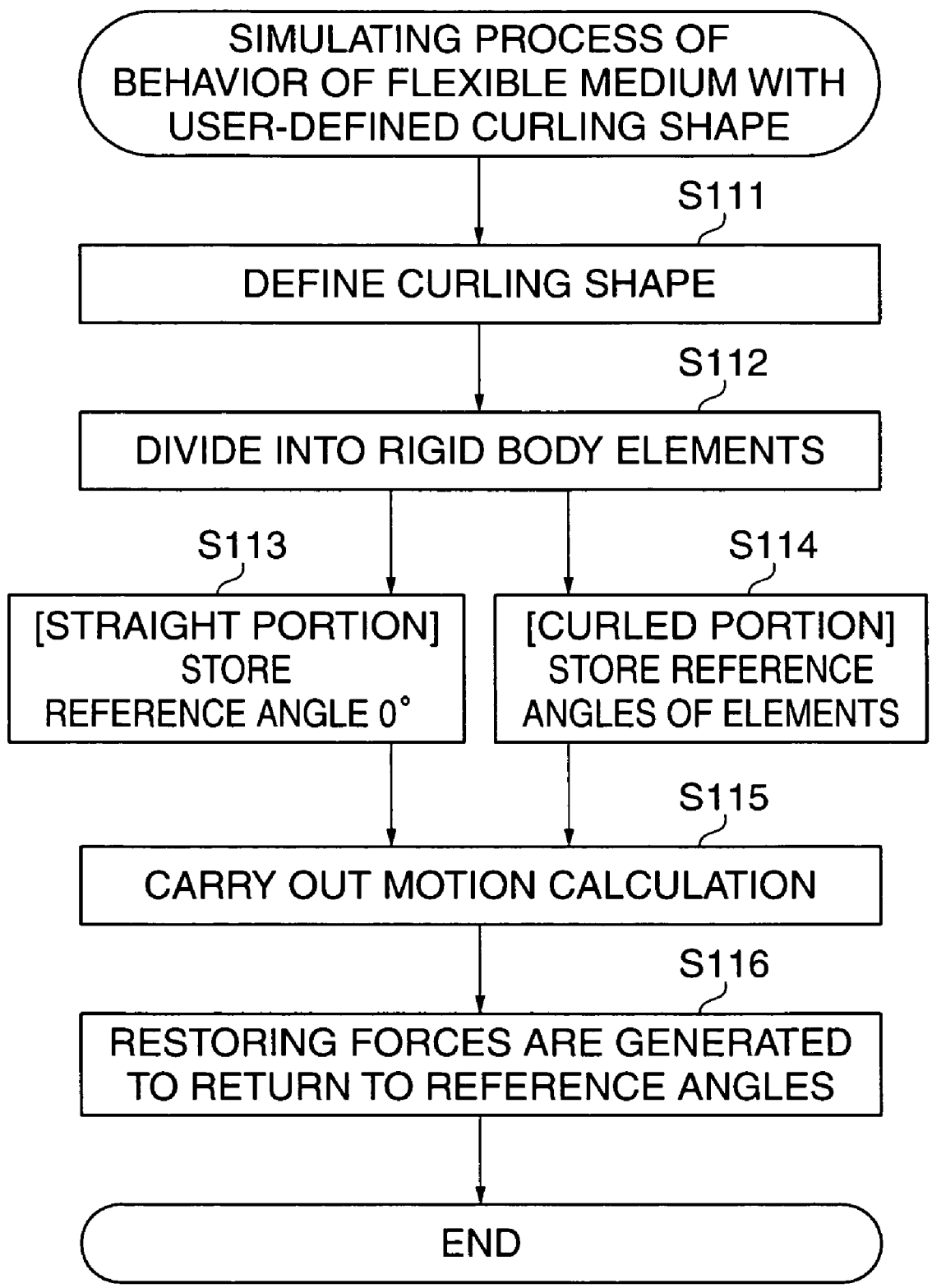
FIG. 34 is a flowchart showing the procedure of a process for simulating the behavior of the flexible medium with a curling shape thereof set by the user.

This will be described with reference to a flowchart of FIG. 34. FIG. 34 is a flowchart showing a procedure of a process for simulating the behavior of the flexible medium with a curling shape thereof set by the user.

As stated above, the flexible medium is first defined and then the shape of the curled portion is defined (step S111). Then, the flexible medium is divided into rigid body elements (step S112). The flexible medium is straight except for the end for which the curled portion is set. At the straight portion, the angle formed by the respective adjacent rigid body elements is 0°, and this angle of 0° is stored as the reference angle (step S113). On the other hand, the end for which the curled portion is set has its curling shape already determined and the angles formed by the respective adjacent rigid body elements corresponding to the curling shape, which are not 0°, are stored as the reference angles (step S114).

Figure 17A:
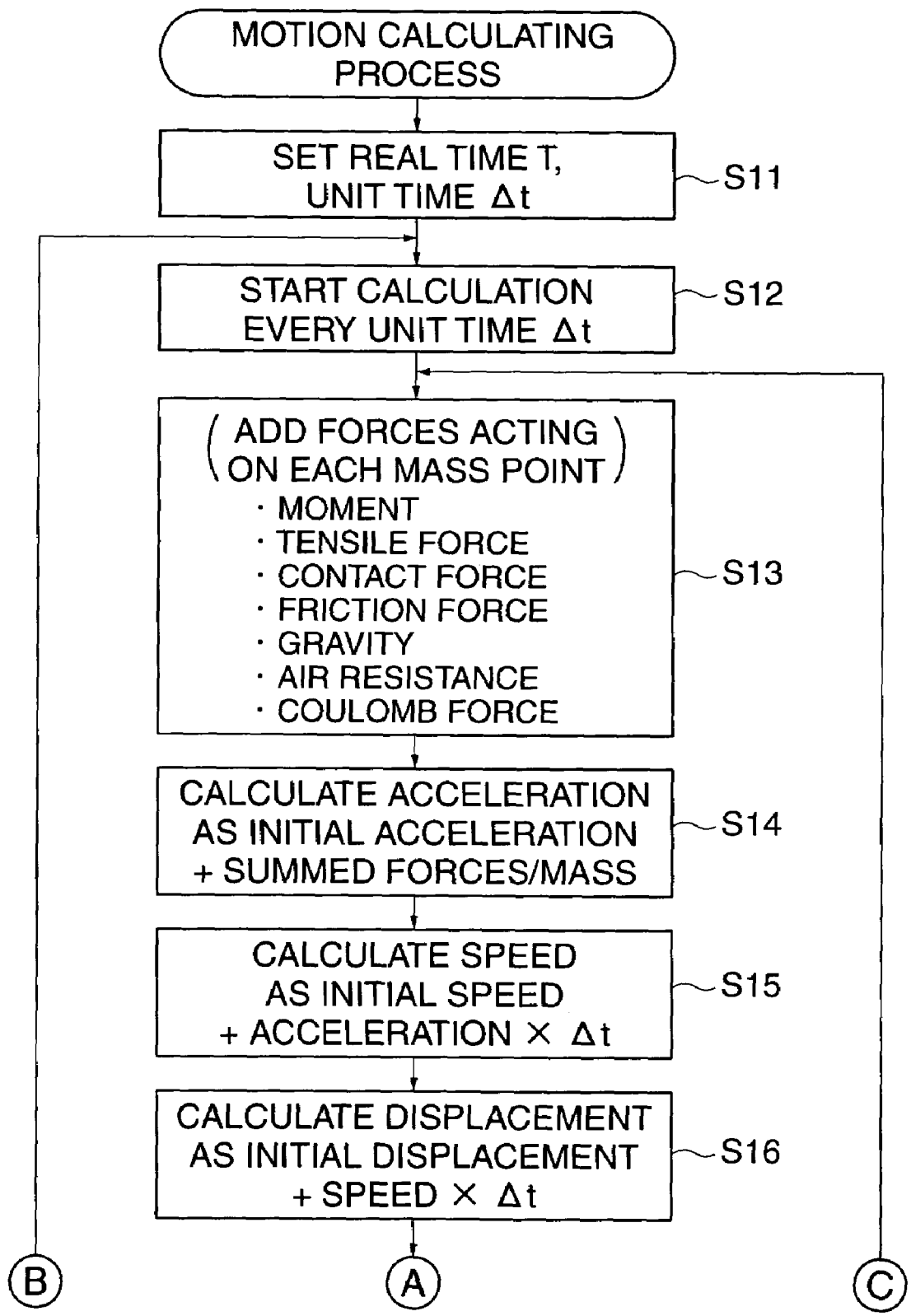
FIGS. 17A and 17B are flowcharts showing the procedure of a motion calculating process in a step S4 appearing in FIG. 4 carried out by a motion calculating section appearing in FIG. 1.
Figure 17B:
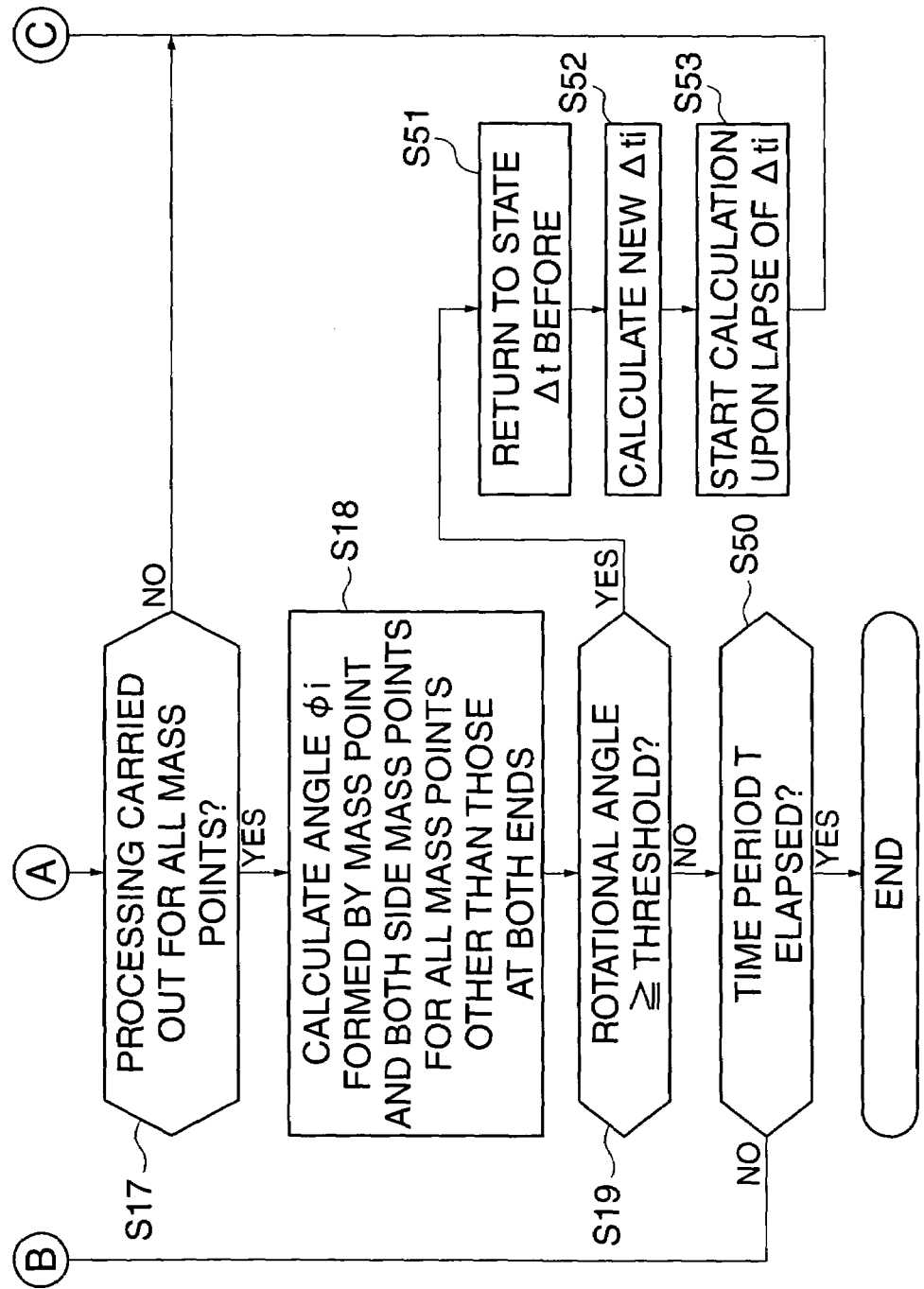

After the motion calculating process in FIGS. 17A and 17B is started (step S115), if there are generated differences between the reference angles stored in the steps S113 and S114 and the angles formed by the respective adjacent rigid body elements, restoring forces proportional to the differences are generated at the respective mass points to restore the angles to the original reference angles (step S116), and the present process is terminated.

As a result, even if the initial shape of the flexible medium is defined as having an arbitrary curved shape, the straight portion and the curled portion present the behavior of returning to the initial straight shape and the defined curling shape, respectively, from the start of the motion calculation.

Figure 35:
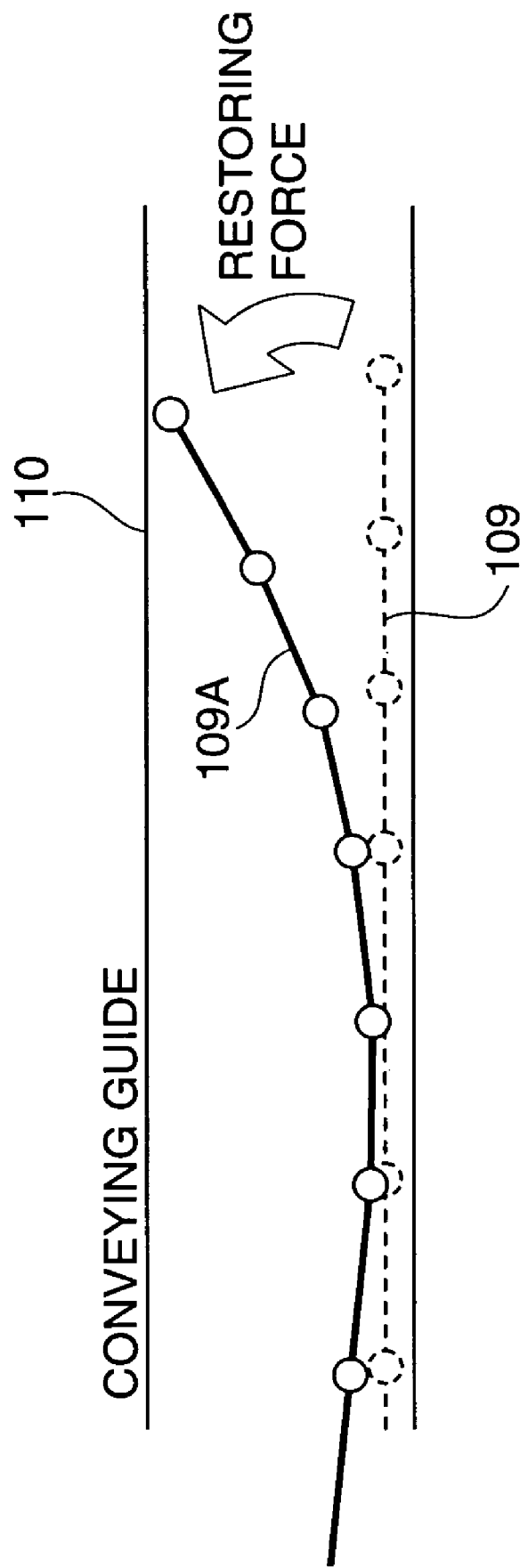
FIG. 35 is a view showing the behavior of the flexible medium when restoring forces are generated at respective mass points in a step S116 in FIG. 34.

FIG. 35 is a view showing the behavior of the flexible medium when the restoring forces are generated at the respective mass points in the step S116 in FIG. 34. In FIG. 35, the shape 109 of the flexible medium indicated by broken lines shows the shape before the motion calculating process is started in the step S115 in FIG. 34. When the motion calculating process in FIGS. 17A and 17B is started, the respective angles formed by the adjacent rigid body elements of the flexible medium 109 tend to return to the reference angles. After the start of the motion calculating process, the flexible medium thus assumes a shape 109A which is in contact with a conveying guide 110. Thereafter, the motion calculating process is repeated until a preset real time period T elapses.

In this way, the shape of the curled portion is determined by the input of the numerical values or the like before the start of the motion calculating process, and the restoring forces are generated so that the shape of the curled portion appears after the start of the motion calculating process. As a result, the curled portion can be set for the flexible medium, and the flexible medium can thus be drawn without difficulties even in a portion of the conveying path narrower than the height of the curled portion.

Moreover, as an example of drawing the flexible medium, the shape of a portion of the flexible medium may be set to an "arc" or a "spline" corresponding to a bent conveying path as shown in FIG. 3.

FIGS. 36A and 36B are views showing a screen for setting the shape of the flexible medium to a shape bent in an arc shape and a spline shape.

As shown in FIGS. 36A and 36B, if the behavior of a flexible medium having the overall length of 300 mm, for example, is simulated in a model of a partial conveying path extracted from an entire conveying path, a straight portion exceeding 300 mm does not exist in the partial conveying path, and it is thus necessary to dispose the flexible medium in a bent state.

The arc guide defining button 24 or the spline guide defining button 25 on the sub-configuration menu 20 in FIG. 3 is used to create a model of the bent flexible medium 109. To create an arc flexible medium model, for example, the arc guide defining button 24 is clicked, and then a start point 111, an intermediate point 112, and an end point 114 are selected as shown in FIG. 36A. The selection is carried out by clicking the screen or inputting numerical values to the command field 40. To create a flexible medium model in the form of a spline curve, the spline guide defining button 25 is clicked, and then several points 115 through which the spline curve passes are selected as shown in FIG. 36B.

Figure 37:
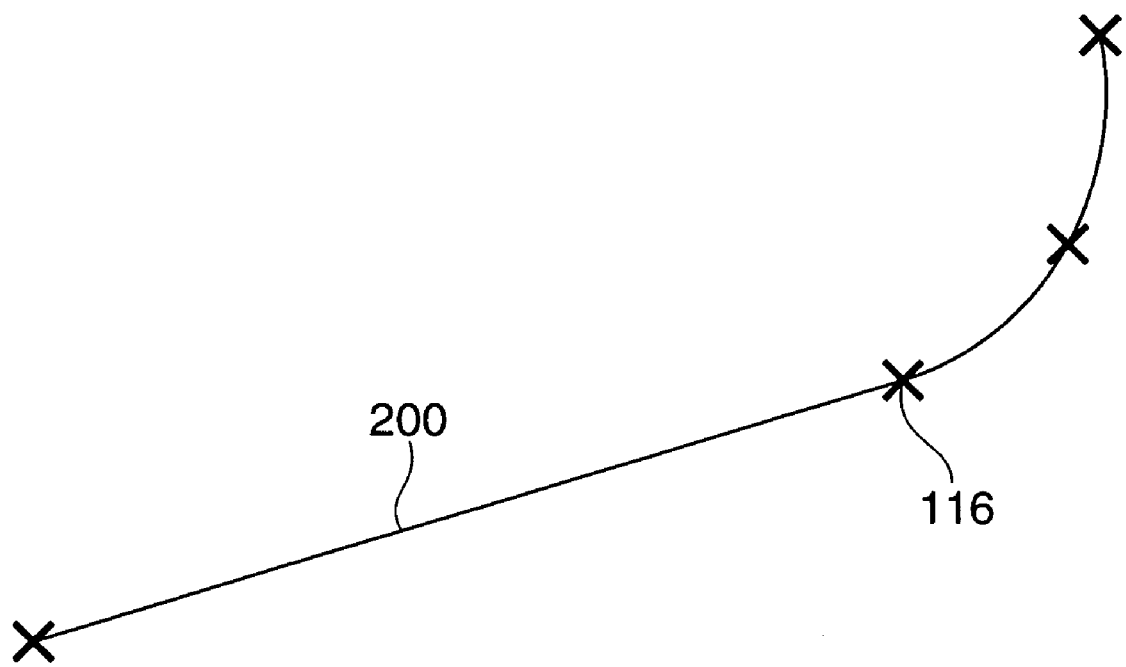
FIG. 37 is a view showing a screen for creating a flexible medium in an arbitrary shape.

Moreover, to create a flexible medium model which is a combination of an arc or a spline curve and a straight line, the straight line guide defining button 23 is clicked, and then, as shown in FIG. 37, an end point of a straight line whose start point is used as an end 116 of the arc or spline created as shown in FIG. 36A or 36B is selected.

In this way, the shape of the flexible medium 109 can be defined as having an arbitrary shape, which is a combination of straight lines, arcs, and spline curves.

If a flexible medium is defined as having an arbitrary shape as shown in FIG. 36A, 36B, or 37, it is assumed that in the flexible medium, which originally has a straight shape, the rotational springs 34 have already been deformed by the angles formed by the rigid body elements before the start of the motion calculation. Since the reference shape of the flexible medium is straight, namely the angles formed by the adjacent rigid body elements are 0°, restoring forces which tend to restore the angles to 0° are generated due to the spring stiffness at the start of the motion calculation.

Figure 38:
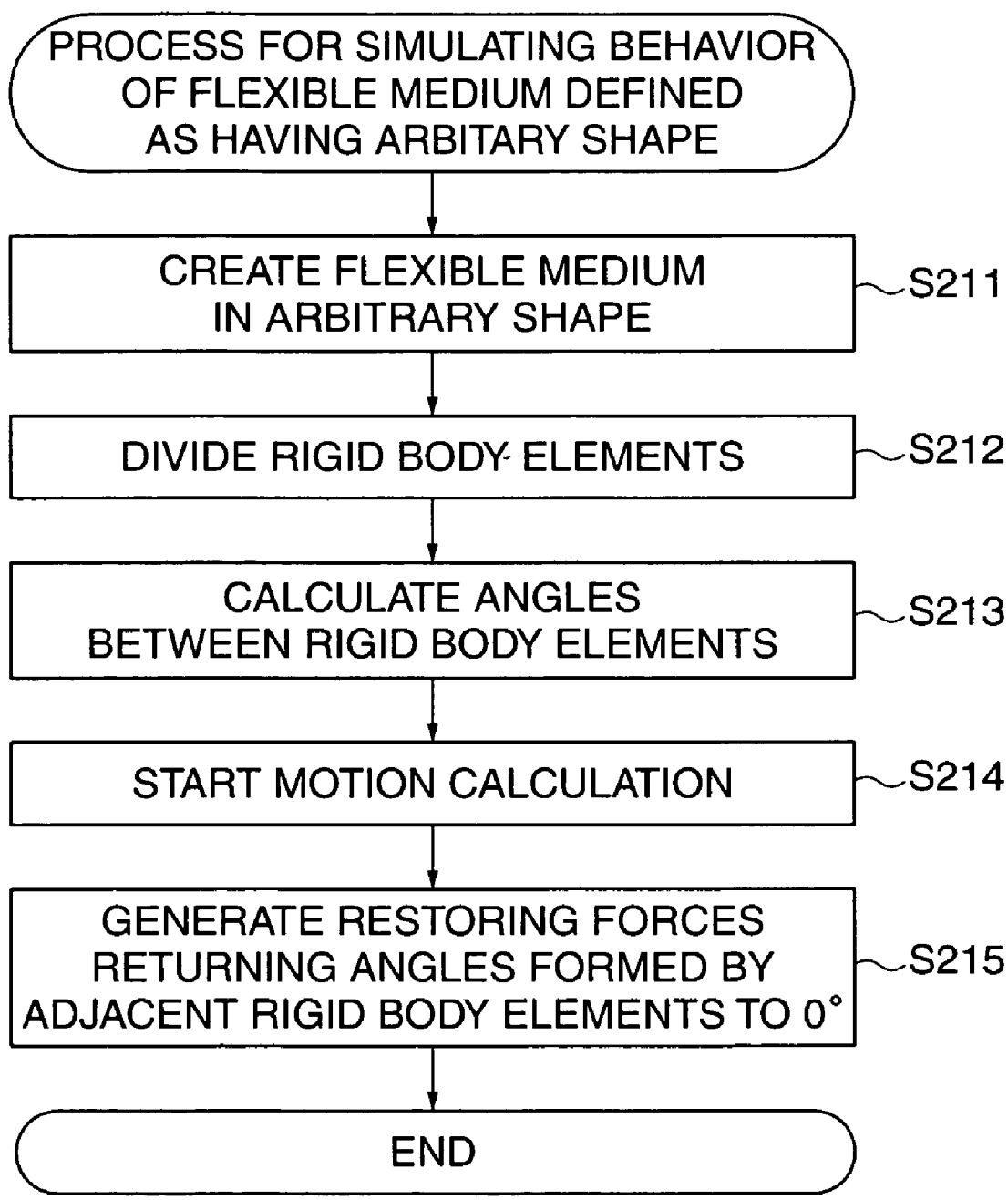
FIG. 38 is a flowchart showing the procedure of a process for simulating the behavior of a flexible medium defined as having an arbitrary shape.

FIG. 38 is a flowchart showing the procedure of a process for simulating the behavior of a flexible medium defined as having an arbitrary shape.

First, a flexible medium having an arbitrary shape including a straight line and an arc is created in the manner described before with reference to FIG. 36A, 36B, or 37 (step S211). Then, the flexible medium is divided into rigid body elements (step S212). At this time, the respective angles formed by the adjacent rigid body elements of the created flexible medium are calculated (step S213). The angles of 0° are calculated with respect to the portion created as a straight line, and the angles of φ are calculated with respect to the portion created as a curve according to the curvature and the number of divisions.

The motion calculation is then started (step S214). If the angles calculated in the step S213 are not 0°, the restoring forces which return the angles formed by the adjacent rigid body elements to 0° are generated at the respective mass points at the start of the motion calculation (step S215), and the present process is terminated. Thereafter, the motion calculation is repeated regularly until the preset real time period T elapses.

Figure 39:
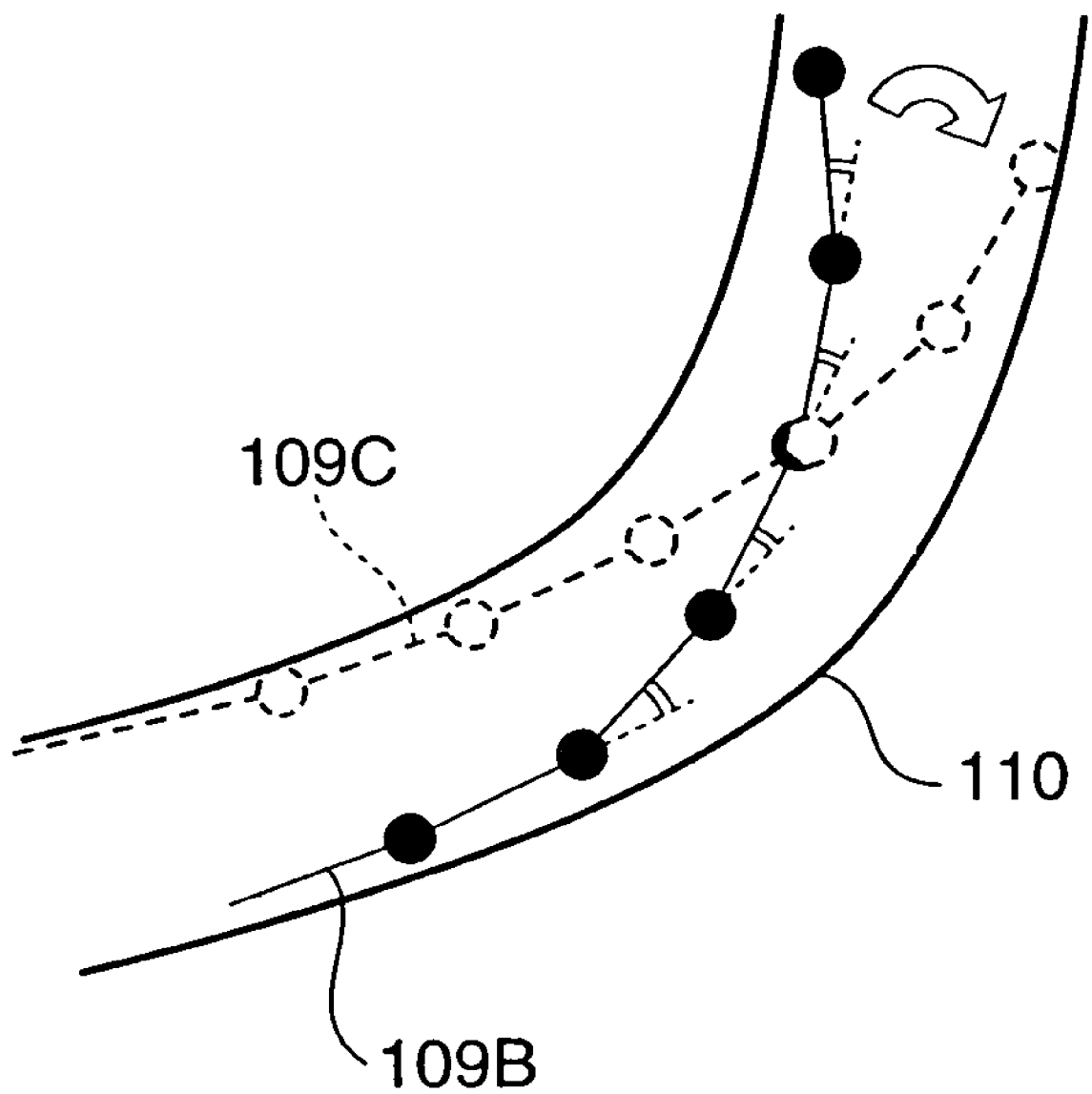
FIG. 39 is a view showing the behavior of a flexible medium placed in a bent conveying path when restoring forces are generated at respective mass points in a step S215 in FIG. 38.

FIG. 39 is a view showing the behavior of the flexible medium placed in a bent conveying path when restoring forces are generated at the respective mass points in the step S215 in FIG. 38.

In FIG. 39, a shape 109B of the flexible medium indicated by solid lines, defined in the step S211 in FIG. 38, is an arc generally following the bent conveying guide 110. When the motion calculating process in FIGS. 17A and 17B is started, the flexible medium tends to return to a straight line which has a shape 109C as indicated by broken lines in FIG. 39. As a result, after completion of the motion calculating process, the flexible medium has the shape 109C which is in contact with the conveying guide 110.

Figure 11:
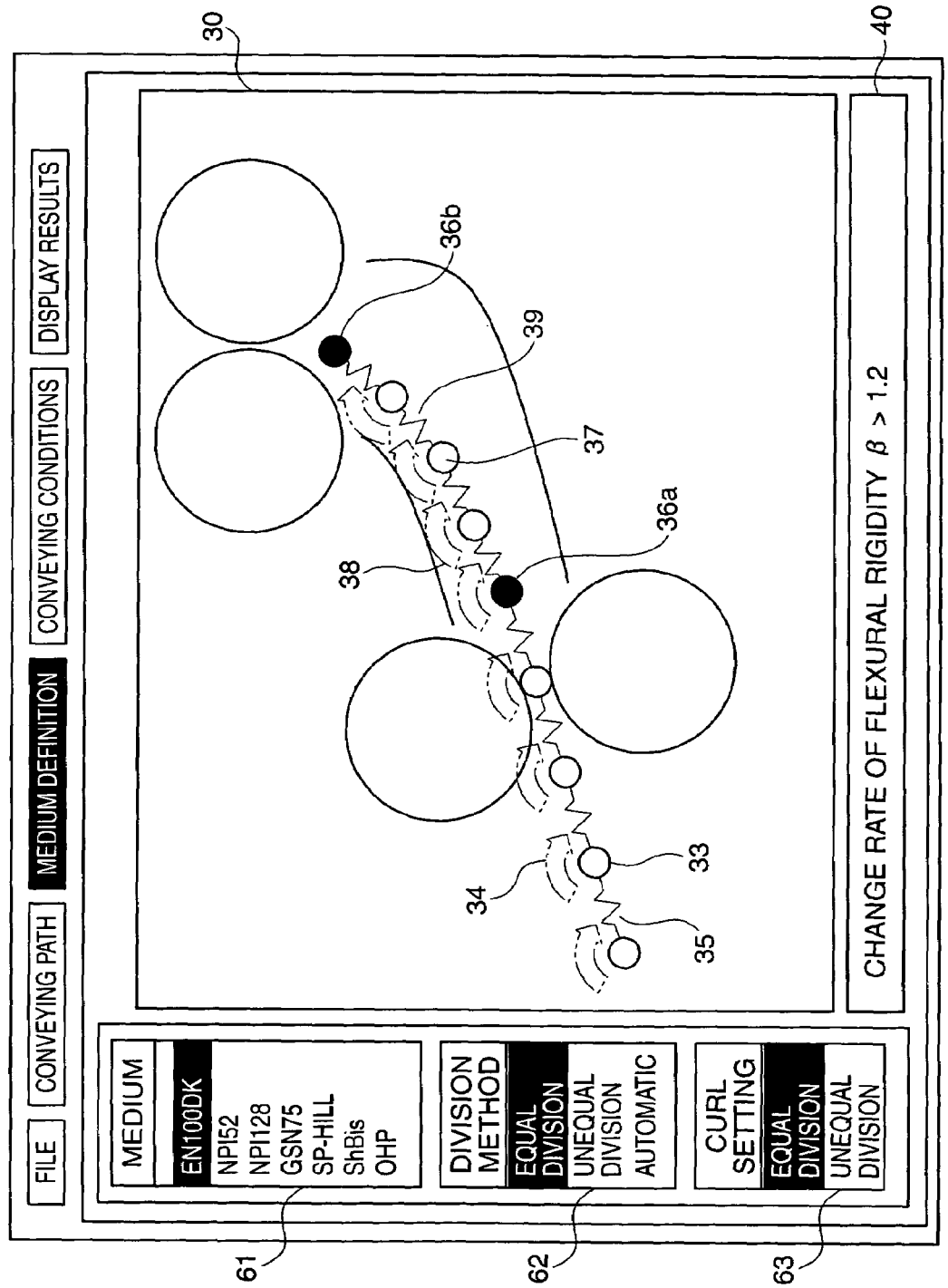
FIG. 11 is a view showing a screen for setting a rate of change $\beta$ of flexural rigidity.

FIG. 11 is a view showing a screen for setting a rate of change β of flexural rigidity by the flexible medium model creating section 3 appearing in FIG. 1. A message prompting input of a condition of the rate of change β of flexural rigidity of the flexible medium due to the curling is displayed in the command field 40. The rate of change β of flexural rigidity is represented as the ratio of the rotational spring constant in the area in which curling is set to the rotational spring constant in the area in which curling is not set. In the present embodiment, to the command field 40 is input a condition specifying that the rate of change β is larger than 1.2. The rotational spring constant kr and translational spring constant ks in the area, in which curling is not set, of the flexible medium are expressed by the following equation (1), where E, w, t, and ΔL represent the Young's constant, the width, the sheet thickness, and the distance between the mass points, respectively, if the equal division is employed as the division method:

$$kr = \frac{Ewt^3}{12\Delta L}, ks = \frac{Ewt}{\Delta L}, \qquad (1)$$

$$\Delta L = \frac{\sqrt{(x_2 - x_1)^2 + (y_2 - y_1)^2}}{n}$$

The mass m of the mass points is represented as: $m = Lwt\rho/(n-1)$ where L, w, t, ρ, and n represent the length, width, thickness, density, and number of divisions, respectively, of the flexible medium, respectively.

The rotational spring constant kri and the translational spring constant ksi are expressed by the following equation (2) if the unequal division (equal ratio division) is employed as the division method:

$$kr_i = \frac{Ewt^3}{6(\Delta L_i + \Delta L_i)},$$  (2)

$$ks_i = \frac{2Ewt}{(\Delta L_i + \Delta L_{i-1})},$$

The interval $\Delta Li$ between the respective adjacent mass points is expressed by the following equation (3) if the division number n is an even number, or by the following equation (4) if the division number n is an odd number, where L represents the overall length of the area, in which curling is not set, of the flexible medium:

$$\Delta Li = \left\{1 + \left(\frac{a-1}{\frac{n}{2}-1}\right)i\right\}L$$  (3)

$$Li = \left\{1 + \left(\frac{a-1}{\frac{n-1}{2}-1}\right)i\right\}L$$  (4)

Therefore, the rotational spring constant krc in the area for which curling is to be set, of the flexible medium is given by the following equation (5):

$$krc = \frac{Ewt^3}{12\Delta L}$$  (5)

$$\Delta L = \frac{\sqrt{(x_2-x_1)^2 + (y_2-y_1)^2}}{n}$$

where $\Delta L$ represents the distance between the adjacent mass points before the coordinates of the mass points change due to the curling.

As a result of the above settings, the modeling of the area for which curling is to be set, of the flexible medium can be defined such that the area is divided into the rigid body elements arranged at equal intervals. Moreover, the rigid body elements and the springs connecting therebetween are automatically arranged and connected with each other along the curled portion. Further, the flexural rigidity of the flexible medium can independently be set for the area for which curling is to be set.

[Unequal Division (Equal Ratio Division)]

In setting curling for the flexible medium by means of the equal ratio division, a method is employed in which the interval between the adjacent mass points at one end of the area for which curling is to be set is defined as having a predetermined ratio to the interval between the adjacent mass points at the other end, and at the same time, the interval between the adjacent mass points at the intermediate portion of the area is sequentially changed at an equal ratio.

If "Unequal division" is selected on the curl setting selecting screen 63 in FIG. 7, a message prompting input of an area for which curling is to be set is displayed in the command field 40. When inputting the area for which curling is to be set, the user may directly designates two mass points for the area for which curling is to be set, among the mass points 33 displayed on the graphic screen 30 using the pointing device 59, or may input numerical values of the coordinates (P1, P2) of these two mass points to the command field 40. Upon inputting the area, mass points, rotational springs, and translational springs generated between the selected two mass points are once deleted.

Figure 12:
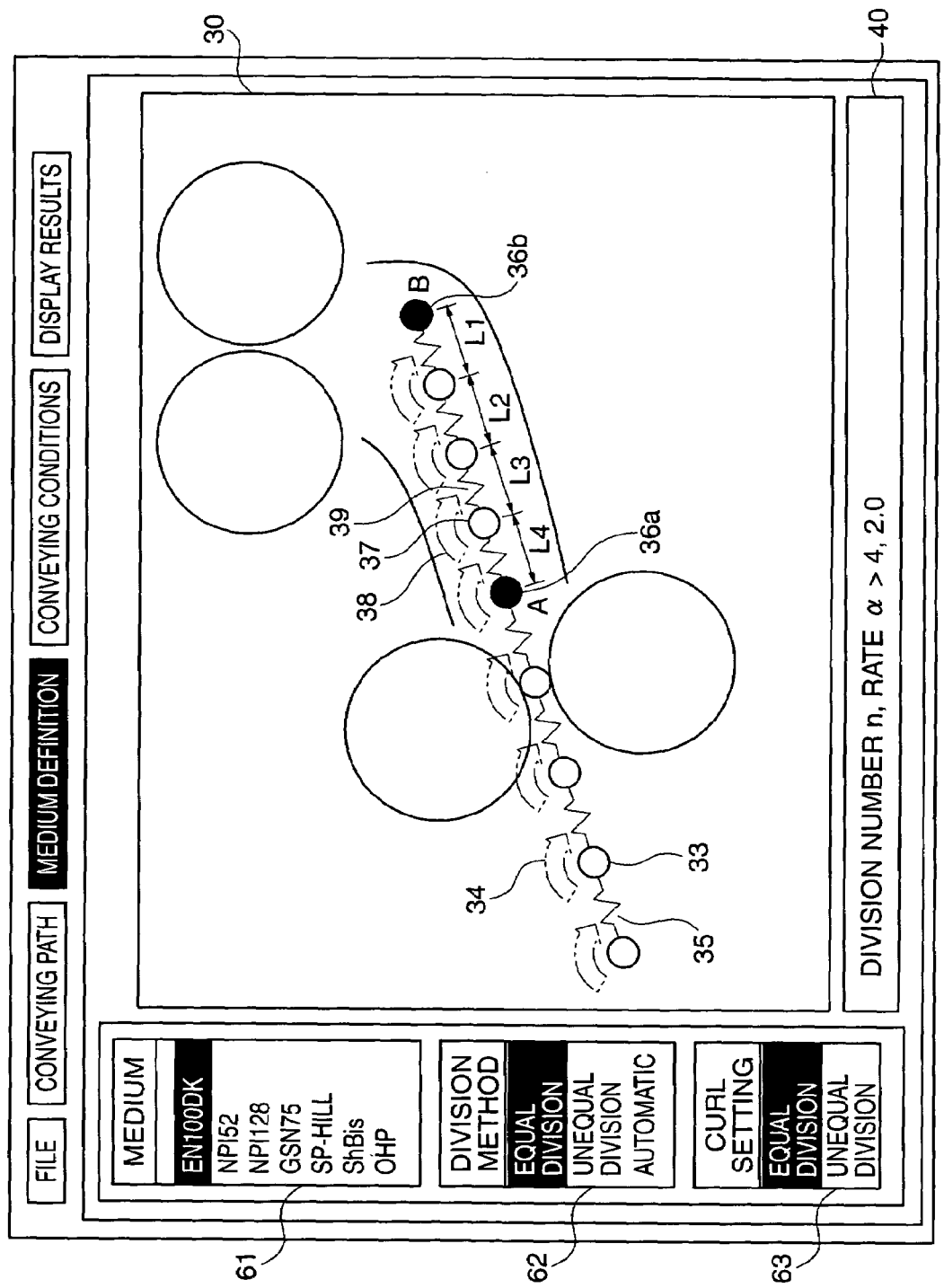
FIG. 12 is a view showing a variation of the screen for dividing the area between the two mass points selected by the user into a plurality of discrete spring-mass systems.

FIG. 12 is a view showing a variation of the screen for dividing the area between the two mass points selected by the user into a plurality of discrete spring-mass systems. In the command field 40, a message prompting input of conditions of the number of divisions n and the end mass point interval ratio α used to divide the area between the selected two mass points 36a and 36b into a plurality of discrete spring-mass systems is displayed. The conditions of the number of divisions n and the end mass point interval ratio α are input to the command field 40.

For example, if the division number n is 4 and the interval L4 between the adjacent mass points at an end A of the area is twice as large as the interval L1 between the adjacent mass points at the other end B, the division number n=4 and the end mass point interval ratio α=2.0 are input to the command field 40, and the end A is designated on the graphic screen 30. As a result, the mass points 37 are arranged in the area for which curling is to be set such that the intervals between the mass points from one end to the other end are in the equal ratio relationship. At the same time, on the screen is displayed a model where the mass points are connected by the rotational springs 38 and the translational springs 39.

The amount of curling (height) is set in the same manner as the setting of the flexible medium by means of the equal division shown in FIG. 9.

Figure 13:
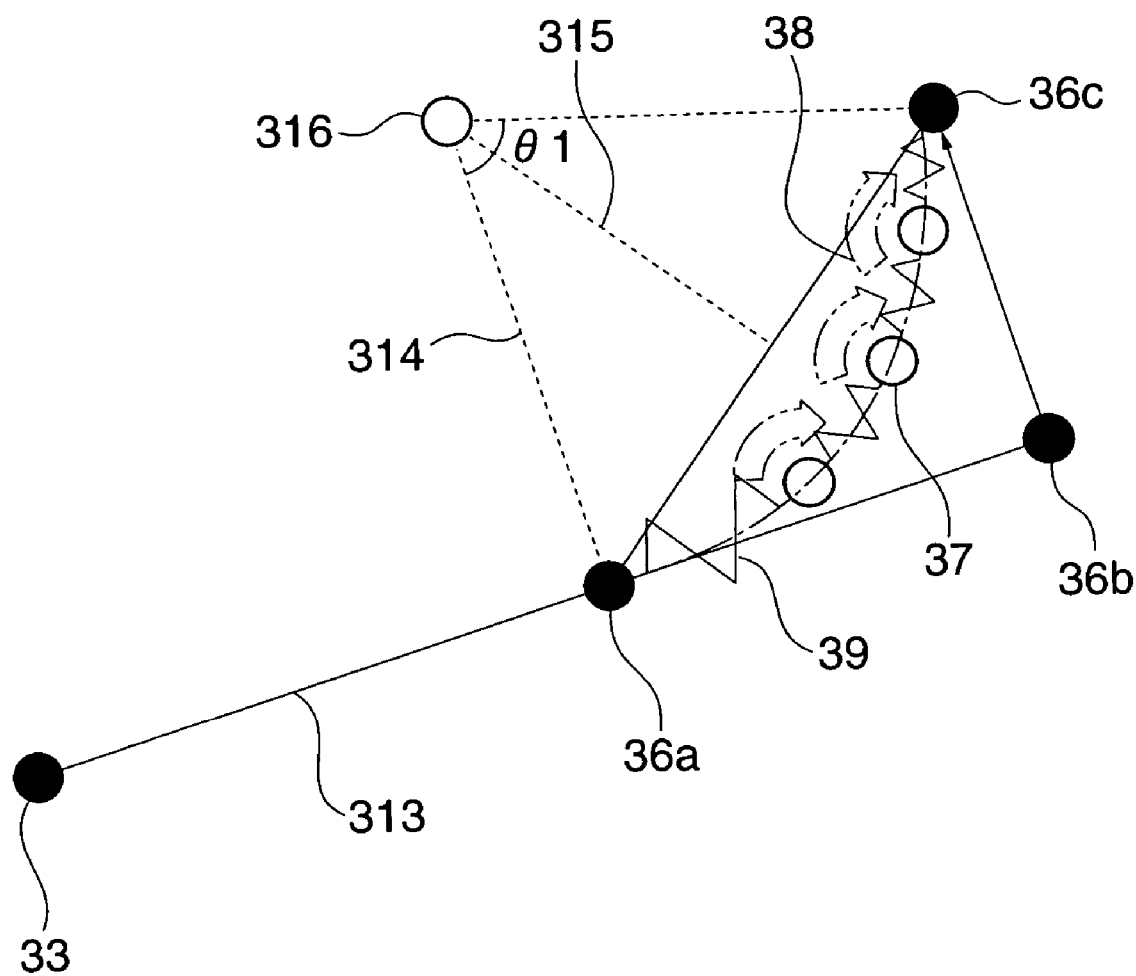
FIG. 13 is a view showing a variation of the method of obtaining the coordinate values of respective mass points arranged in an area for which curling has been set, according to the present embodiment.

FIG. 13 is a view showing a variation of the method of obtaining the coordinate values of respective mass points arranged in the area for which curling has been set, according to the present embodiment. A mass point 36c is placed at a point displaced by the amount of curling "h" from the mass point 36b in a direction perpendicular to a line 313 connecting between the mass point 33 at an end of the area in which curling is not set, and the mass point 36a at the border between the area in which curling is not set and the area in which curling is set, the mass point 36b being at an end of the area in which curling is set which is opposite to the above border.

A perpendicular line 314 passing through the mass point 36a is then drawn in the direction perpendicular to the line 313. A perpendicular bisector 315 is then drawn with respect to a line connecting between the mass points 36a and 36c. Then, the mass points 37 obtained according to the number of divisions n and the end mass point interval ratio α are arranged at equal ratio intervals-along the circumference of a circle with its center being the intersection 316 of the perpendicular line 314 and the perpendicular bisector 315, passing through the mass points 36a and 36c.

Then, the coordinates of the respective mass points arranged at the equal ratio intervals are obtained by dividing an angle θ1 formed between the line 314 and a line connecting between the mass point 36c and the intersection 316 so as to obtain the end mass point interval ratio α. Moreover, the rotational springs 38 and the translational springs 39 connecting between the arranged mass points are automatically arranged.

The display for input of the rate of change β of flexural rigidity to the command field 40 for the unequal division is similar to that in FIG. 11.

A message prompting input of a condition of the rate of change β of flexural rigidity of the flexible medium due to the curling is displayed in the command field 40. The rate of change β of flexural rigidity is represented as the ratio of the rotational spring constant in the area in which curling is set to the rotational spring constant in the area in which curling is not set. In the present embodiment, as the rate of change β of flexural rigidity, a value of 1.2 is input. The rotational spring constant krci in the area for which curling is to be set is calculated by the following equation (6):

$$krc_i = \frac{Ewr^3}{6(\Delta L_i + \Delta L_{i-1})} \quad (6)$$

The interval ΔLi between the respective adjacent mass points is expressed by the above given equation (3) if the division number n is an even number, or by the above given equation (4) if the division number n is an odd number, where L represents the overall length of the area for which curling is to be set, of the flexible medium before the coordinates of the respective mass points are changed by the curling.

As a result of the above settings, the modeling of

As a result of the above settings, the modeling of the area for which curling is to be set, of the flexible medium can be defined such that the area is divided into the rigid body elements at equal ratio intervals. Moreover, the rigid body elements and the springs connecting therebetween are automatically arranged and connected with each other along the curled portion. Further, the flexural rigidity of the flexible medium can independently be set for the area for which curling is to be set. After the process of dividing the area into the discrete spring-mass elements by the flexible model creating section 3 is completed, the CPU 51 proceeds to the processing by the conveying condition setting section 4.

[Conveying Condition Setting Section]

The conveying condition setting section 4 defines drive conditions of the conveying rollers, the control of the flappers which branch the conveying path, and friction coefficients generated upon contact of the flexible medium with conveying guides and conveying rollers.

Figure 14:
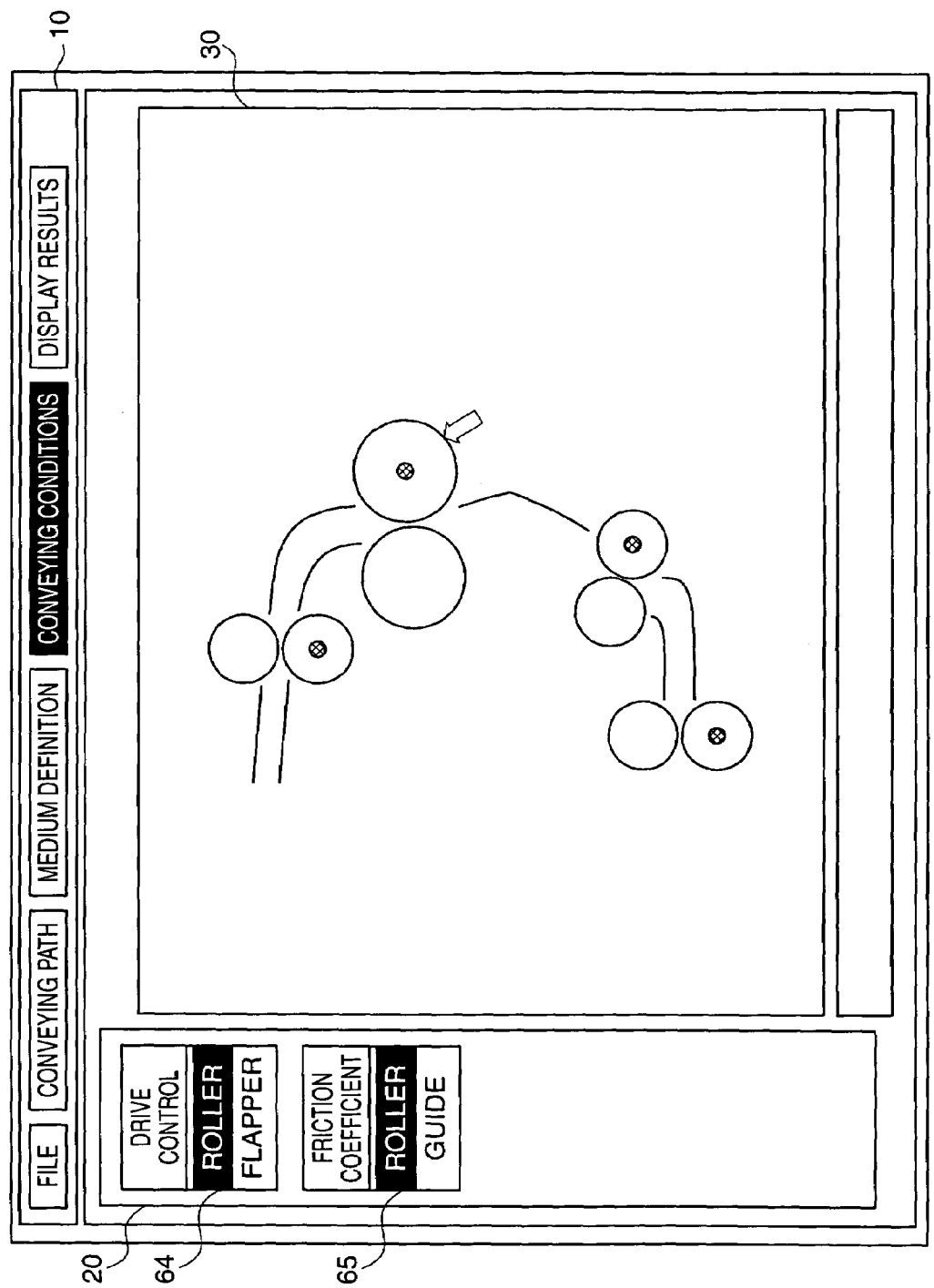
FIG. 14 is a view showing a screen for setting conveying conditions by a conveying condition setting section appearing in FIG. 1.

FIG. 14 is a view showing a screen for setting conveying conditions by the conveying condition setting section 4 appearing in FIG. 1. The setting of the conveying conditions by the conveying condition setting section 4 is started if the conveying condition button 14 in the menu bar 10 is clicked. Upon click of the button 14, a drive control selecting screen 64 used to define the drive conditions and a friction coefficient selecting screen 65 used to define the friction coefficients are displayed on the sub-configuration menu 20.

FIG. 14 shows a case where the drive control of a roller is input. When the drive condition "Roller" on the sub-configuration menu 20 is selected, a roller for which the drive condition is set is selected from among the conveying rollers shown on the graphic screen 30. Upon completion of the selection of the roller, a graph showing a time change of the rotational speed of the roller is displayed on the graphic screen 30.

Figure 15:
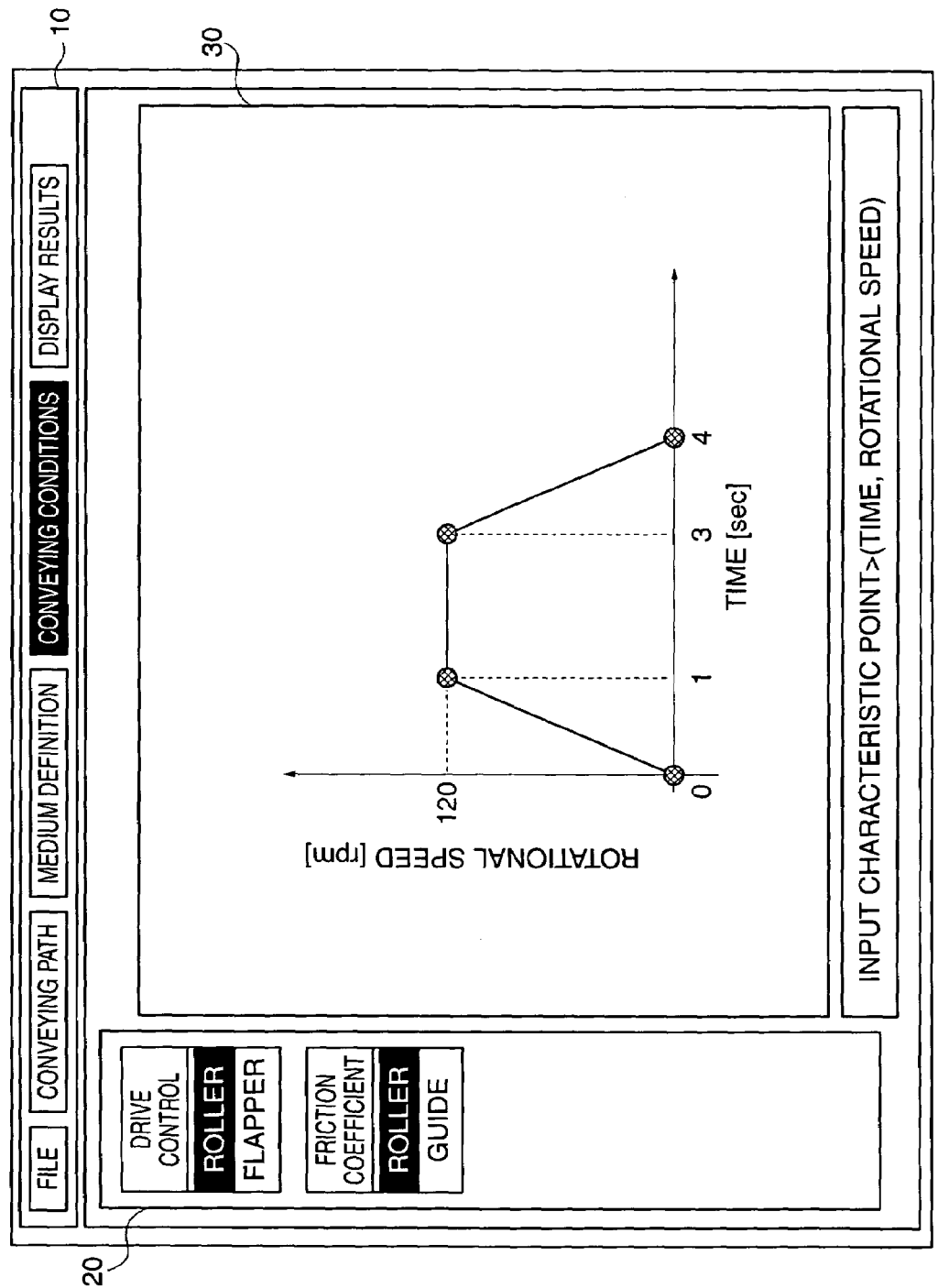
FIG. 15 is a graph showing a time change of the rotational speed of a roller displayed on the display appearing in FIG. 2 upon characteristic points being input.

FIG. 15 is the graph showing the time change of the rotational speed of the roller appearing on the display 56 appearing in FIG. 2 when characteristic points have been input. As characteristic points each comprised of a combination of (time and rotational speed) are input as needed to the command field 40, a graph corresponding to the input characteristic points is created on the graphic screen 30. In the present embodiment, the rotational speed is linearly increased from 0 rpm to 120 rpm from "0" to "1" second, the rotational speed is maintained at 120 rpm for a time period of "1" to "3" seconds, and then the rotational speed is linearly decreased from 120 rpm to 0 rpm for a time period of "3" to "4" seconds. The definition of the control of a flapper used at a branched path is defined similarly to that of the roller except that the unit of the ordinate of the graph in FIG. 15 is "angle" in stead of "rotational speed".

For the definition of the friction coefficient, when "Friction coefficient" is selected as a drive condition on the sub-configuration menu 20, a roller or a guide shown on the graphic screen 30 is specifically selected to input the friction coefficient μ between the roller or guide and a sheet to the command field 40.

Figure 16:
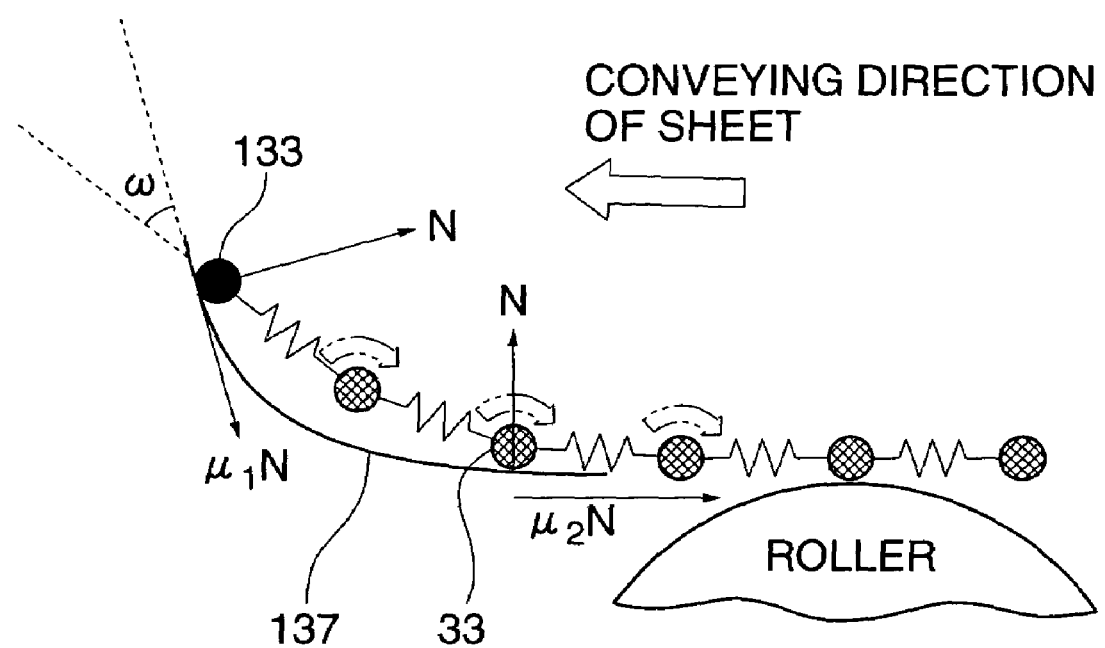
FIG. 16 is a view showing the definition of the friction coefficient between the flexible medium and a conveying guide.

FIG. 16 is a view showing the definition of the friction coefficient between the flexible medium and the conveying guide. If the input friction coefficient μ is used and a vertical drag obtained by calculations relating to the contact between the mass points of the flexible medium and the roller or the guide is set to N, a friction force μN is generated, which acts in a direction opposite to the conveying direction of the sheet. To determine the friction force, as the friction coefficient μ, the friction coefficient between the mass point 133 at the leading end of the flexible medium and the conveying guide 137, and the friction coefficient between the mass points 33 at the area other than the leading end of the flexible medium and the conveying guide 137 are set separately from each other.

Figure 21:
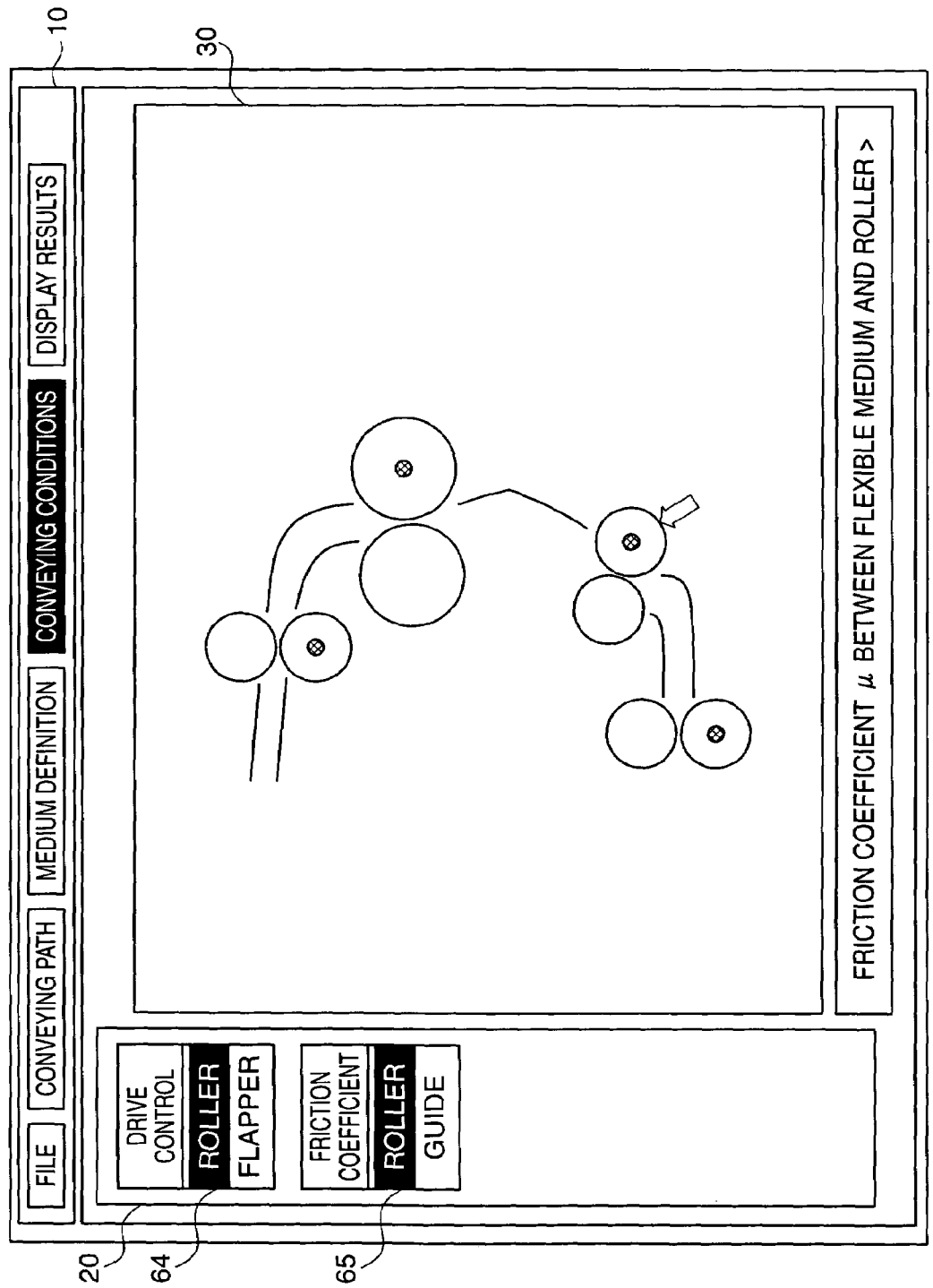
FIG. 21 is a view showing a screen for setting a friction coefficient generated upon contact between the flexible medium and a conveying roller.

FIG. 21 is a view showing a screen for setting the friction coefficient generated upon contact between the flexible medium and the conveying roller. On the sub-configuration menu 20, the drive control selecting screen 64 and the friction coefficient selecting screen 65 are displayed. If "Roller" is selected as the friction coefficient on the friction coefficient selecting screen 65, any of rollers shown on the graphic screen 30 becomes selectable, and the friction coefficient μ between the selected roller and the flexible medium can then be input to the command field 40.

Figure 22:
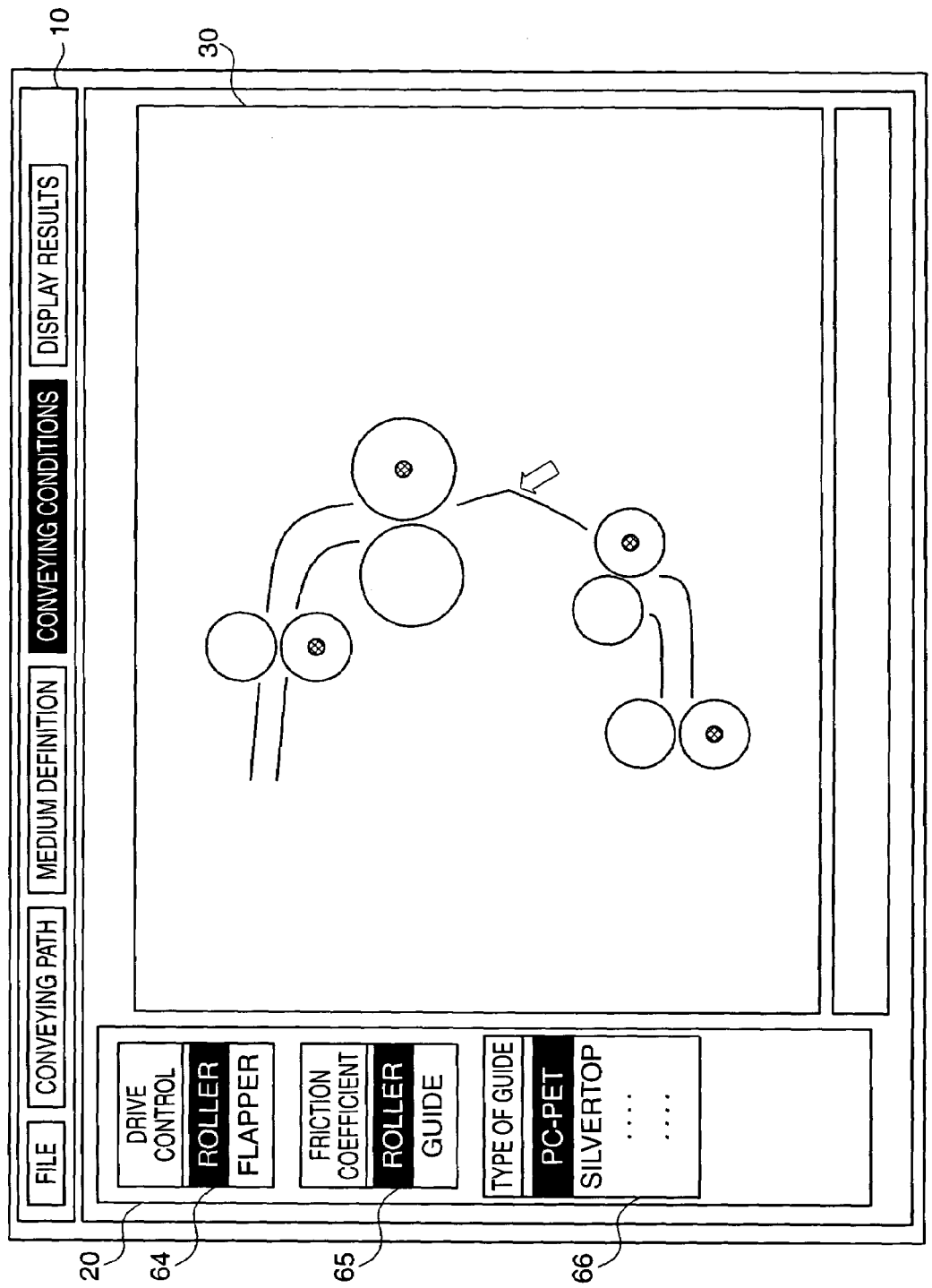
FIG. 22 is a view showing a screen for automatically setting the friction coefficient between a flexible medium and a conveying guide.

FIG. 22 is a view showing a screen for automatically setting the friction coefficient between the flexible medium and the conveying guide. If "Guide" is selected as the friction coefficient, any of guides displayed on the graphic screen 30 becomes selectable. At this time, on the sub-configuration menu 20 is displayed a guide type selecting screen 66 for selecting the type of the guide, and the types of the respective guides can thus be selectable.

In FIG. 22, it is seen that "PC-PET" is selected as the type of the guide. As a result of this setting, the friction coefficient between the flexible medium and the selected conveying guide is automatically set.

Figure 23:
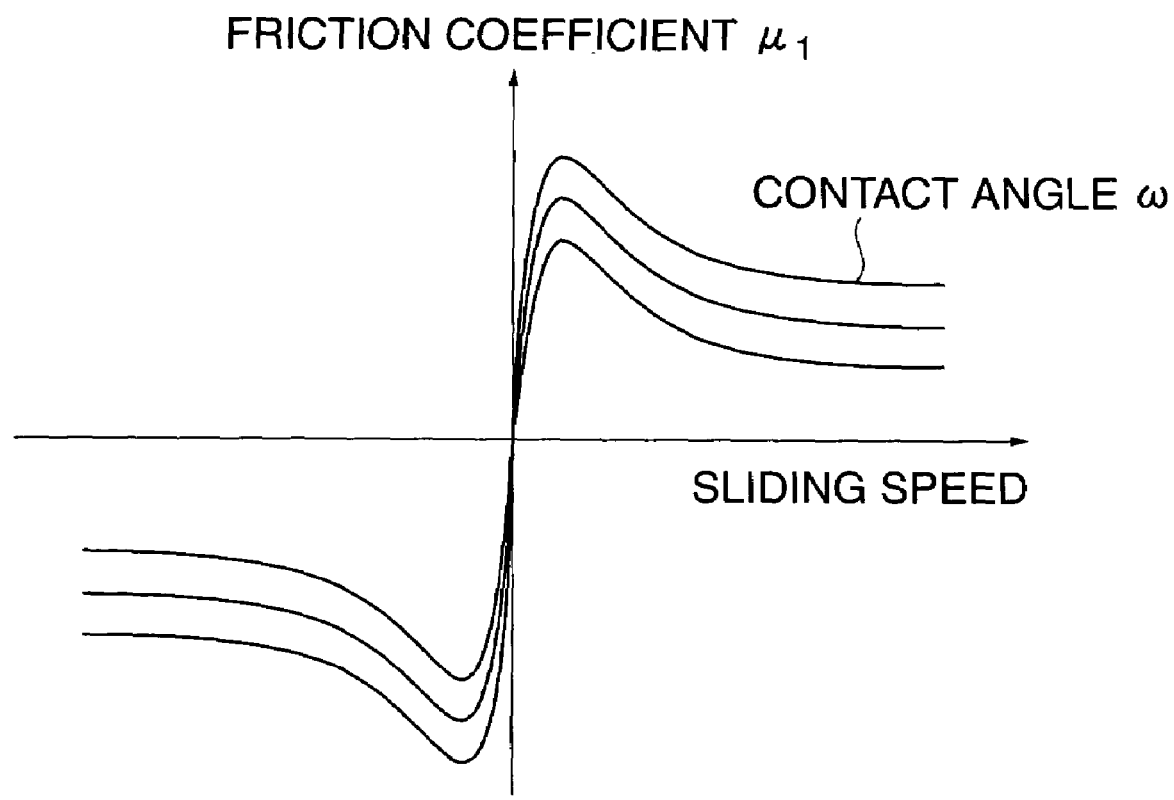
FIG. 23 is a graph showing a friction coefficient $\mu 1$ generated between a mass point at the leading end of the flexible medium and the conveying guide.

FIG. 23 is a graph showing a friction coefficient μ1 generated between the mass point 133 at the leading end of the flexible medium and the conveying guide 137. The sliding speed of the flexible medium and the contact angle ω (refer to FIG. 16) between the flexible medium and the conveying guide, which are used for obtaining the friction coefficient μ1 as parameters, are automatically calculated inside the design support system 1. Based on these two parameters, the friction coefficient μ1 is calculated, and is then applied to the calculation. The graph shown in FIG. 23 is empirically created, and is stored as data in a storage device (hard disk 55) of the design support system 1.

Figure 24:
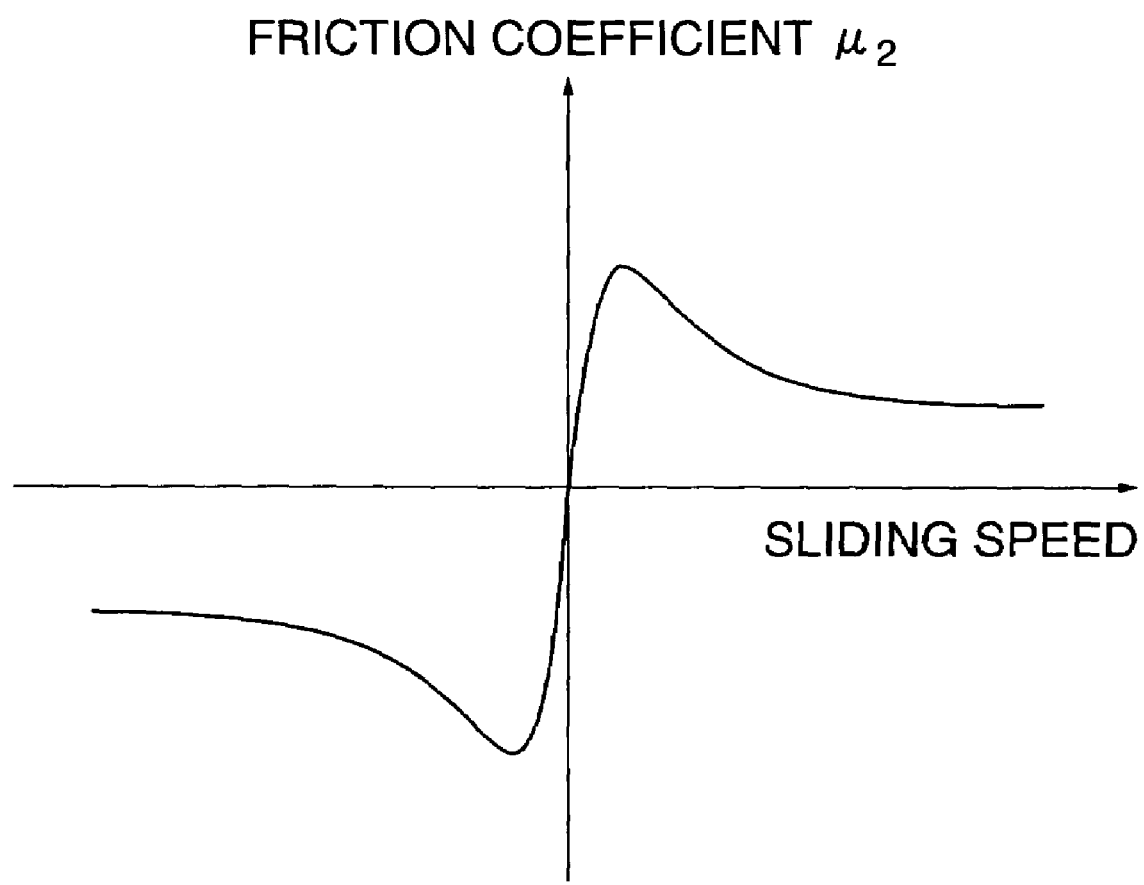
FIG. 24 is a graph showing a friction coefficient $\mu 2$ generated between a mass point at an area other than the leading end of the flexible medium and the conveying guide.

FIG. 24 is a graph showing a friction coefficient μ2 generated between the mass points 33 at the area other than the leading end of the flexible medium and the conveying guide 137, and calculated inside the design support system 1 in FIG. 1. When calculating the friction coefficient μ2, only the sliding speed of the flexible medium which is the only parameter for calculating the friction coefficient, is thus automatically calculated inside the design support system 1. Based on this parameter, the friction coefficient μ2 is calculated, and is then applied to the calculation. The friction coefficient μ2 between the mass points 134 at the area other than the leading end of the flexible medium and the conveying guide 137 is the same as the friction coefficient μ1 obtained when the contact angle ω is 0 (zero) degrees, and is thus readily obtained from the graph in FIG. 23.

As a result of the above settings, the friction coefficient between the flexible medium and the conveying guide can be set in a separate manner between the friction coefficient between the rigid body element at the leading end of the flexible medium and the conveying guide, and the friction coefficient between the rigid body elements at the area other than the leading end of the flexible medium and the conveying guide. Moreover, as the friction coefficient between the rigid body element at the leading end of the flexible medium and the conveying guide, a friction coefficient dependent upon the sliding speed of the flexible medium and the contact angle between the flexible medium and the conveying guide is used. Further, as the friction coefficient between the rigid body elements at the area other than the leading end of the flexible medium and the conveying guide, a friction coefficient dependent only upon the sliding speed of the flexible medium is used.

Figure 25:
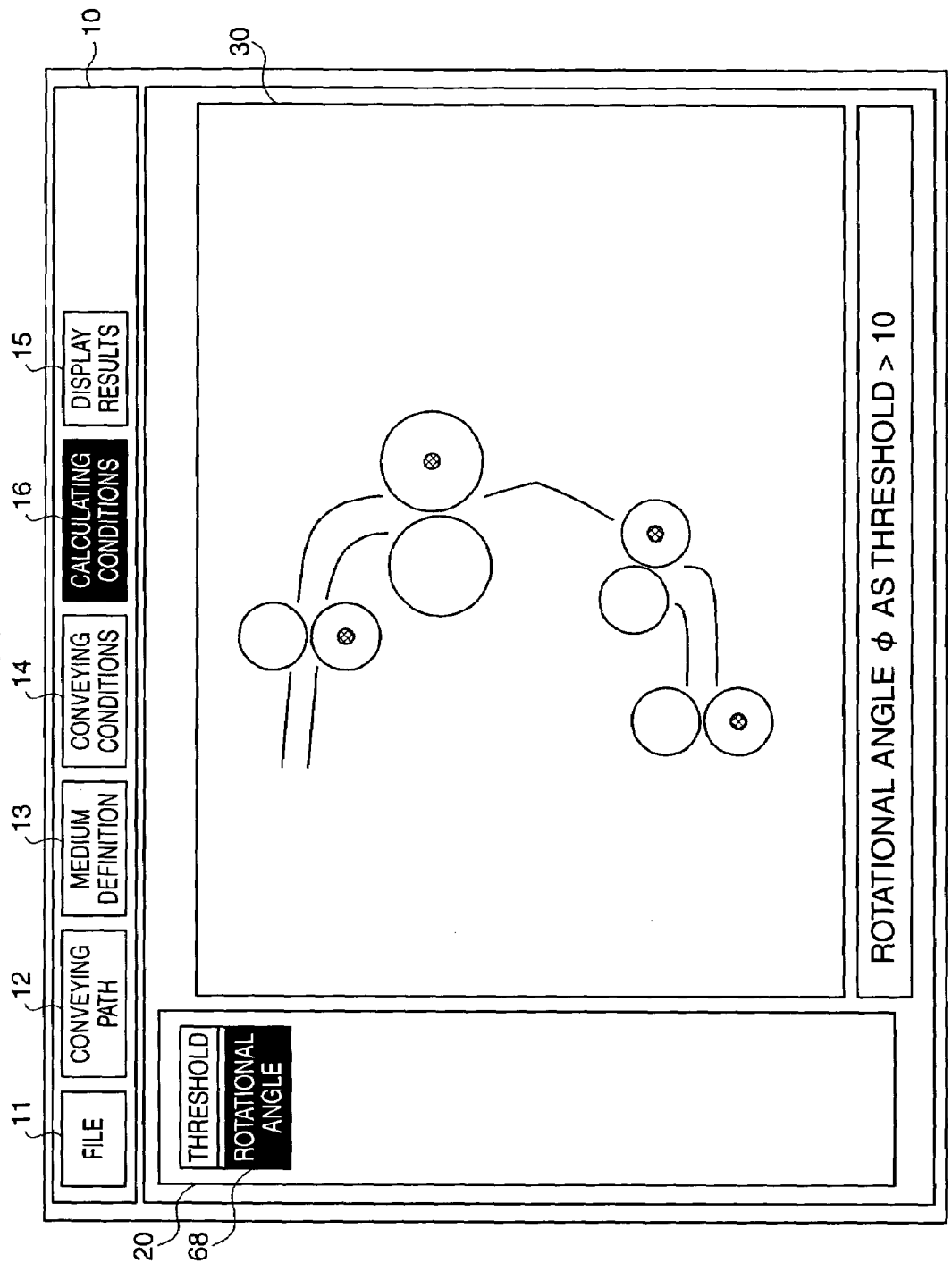
FIG. 25 is a view showing a screen for inputting a rotational angle $\phi c$ used as a threshold.

A description will now be given of setting of a rotational angle φc at which a large deformation effect of the flexible medium starts to occur. FIG. 25 is a view showing a screen for inputting the rotational angle φc as a threshold. When a calculation condition button 16 in the menu bar 10 is clicked, a threshold setting screen 68 is displayed on the sub-configuration menu 20.

If "Rotational angle" on the threshold setting screen 68 is selected, a message prompting input of the rotational angle φc as the threshold is displayed in the command field 40. The user then inputs a value of the rotational angle φc to the command field 40. In the present embodiment, the rotational angle φc is set to "10". As a result, the input of the rotational angle φc, namely the angle at which the large deformation effect starts to occur as the threshold is completed.

[Motion Calculating Section and Element Subdividing Section]

FIGS. 17A and 17B are flowcharts showing the procedure of the motion calculating process in the step S4 in FIG. 4 carried out by the motion calculating section 5 in FIG. 1.

First, the CPU 51 sets the real time period T which is a period of time over which the flexible medium makes motion, and a unit time Δt by which numerical value time integration is carried out to numerically solve a motion equation (step S11). The CPU 51 calculates the motion of the flexible medium every unit time Δt, starting from an initial time (step S12). The respective calculation results are stored in the hard disk 55 (storage device).

Specifically, initial acceleration, initial speed, and initial displacement required for the calculation carried out every unit time Δt are set, to thereby define forces acting upon each of the mass points which form the flexible medium (step S13). The forces defined here include rotation moment, tensile force, contact force, friction force, gravity, air resistance, and Coulomb force. After the calculation of the forces acting on the mass point, the resultant force thereof is finally defined as a force acting upon the flexible medium.

The CPU 51 divides the forces acting on the mass point obtained in the step S13 by the mass of the mass point, and adds the initial acceleration to the result of the division to calculate acceleration after the lapse of the unit time Δt (step S14). The CPU 51 multiplies the calculated acceleration by the unit time Δt, and then adds the initial speed to the result to calculate velocity after the lapse of the unit time Δt (step S15).

The CPU 51 multiplies the calculated velocity by the unit time Δt, and then adds the initial displacement to the result to calculate displacement of the mass point (step S16). The CPU 51 stores these calculated values in the hard disk 55 (storage device) in the respective calculation steps as described above.

The CPU 51 then determines whether or not the above described processing has been carried out for all the mass points (step S17). If the CPU 51 has not carried out the processing for all the mass points, the CPU 51 returns to the step S13, and repeats the same processing.

If the CPU 51 determines that the above described processing has been carried out for all the mass points in the step S17, the CPU 51 calculates the angle φi formed between each mass point and the mass points on the both sides thereof for all the mass points other than the mass points at the both ends of the flexible medium based on the displacement calculated in the step S16 every unit time Δt and position information (step S18).

Figure 26:
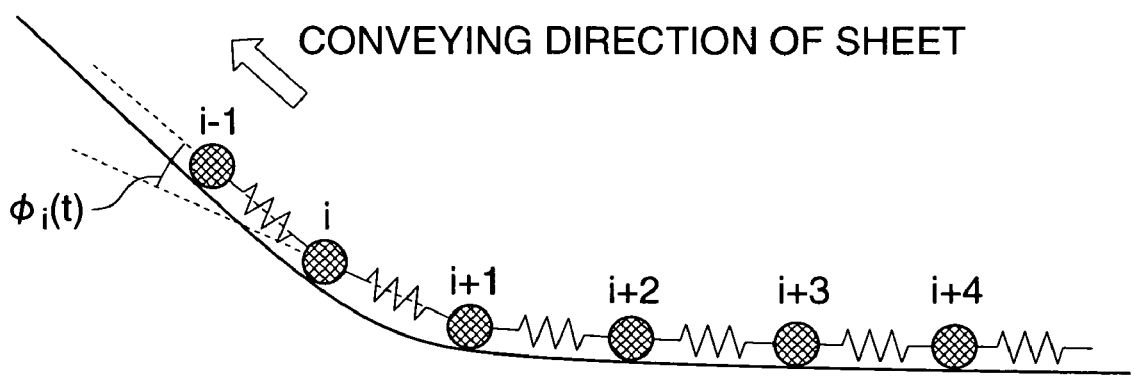
FIG. 26 is a view showing an angle formed by a mass point and mass points on both sides of the mass point at a certain time point "t"

FIG. 26 is a view showing an angle formed by a mass point and mass points on both sides of the mass point at a certain time point t. An angle formed between a mass point i and mass points i−1 and i+1 on the both sides of the mass point i at the time point t is calculated as an angle φi(t). It is assumed that a large deformation effect does not occur on the flexible medium at the time point t. Then, the CPU 51 starts the above calculation after the lapse of the unit time Δt to obtain the displacement of the mass point at the time point t+Δt in the steps S13 to S16. In the same manner, the angle formed between each of the mass points and the mass points on the both sides thereof is calculated for all the mass points other than the mass points at the both ends of the flexible medium in the step S18. In this calculation, the angle formed by the mass point and the mass points on the both sides thereof is represented by φi(t+Δt). The amount of the change Δφi of the angle formed by the mass points is obtained based on an angle φi(t) obtained at the last unit time and the angle φi(t+Δt) obtained at the present unit time by the following equation (7):

$$\Delta\phi i = |\phi i(t+\Delta t) - \phi i(t)| \tag{7}$$

The CPU 51 determines whether or not the rotational angle has become not less than the rotational angle φc used as the threshold, based on the result of the calculation carried out according to the equation (7) for all the mass points other than the mass points at the both ends of the flexible medium (step S19). Namely, the CPU 51 determines whether or not a large deformation effect has occurred. If the amount of the change Δφi is not less than the rotational angle φc input into the command field 40, it indicates that a large deformation effect has occurred on the flexible medium. In the present embodiment, if the amount of change Δφi of the mass point i is "15", the amount of change Δφi is larger than the threshold "10" of the rotational angle φc, and the CPU 51 determines that a large deformation effects has occurred.

If the rotational angle has become not less than the rotational angle φc used as the threshold, namely it is determined that a large deformation effect has occurred in the step S19. In this case, the CPU 51 returns from the state processing at the time t+Δt to that at the time t, and thus returns to the state one unit time Δt before in terms of the forces, acceleration, speed, and displacement calculated (step S51). Based on the rotational angle φc used as the threshold, the amount of change Δφi in the angle formed by the mass point i, and the unit time Δt, the CPU 51 calculates a new unit time Δti according to the following equation (8) (step S52):

$$\Delta ti = (\phi c / \Delta \phi i) \Delta t \qquad (8)$$

In the example of FIG. 26, at the mass point i, the value of the new unit time Δti is 0.6667×Δt. The CPU 51 then starts the calculation upon the lapse of the unit time Δti (step S53). In the same manner as above, the CPU 51 carries out the processing in the steps S13 to S18 to calculate the acting forces, the acceleration, the speed, and the displacement of the respective mass points, and the angle formed between each mass point and the mass points on the both sides thereof for all the mass points other than the mass points at the both ends of the flexible medium.

If the rotational angle becomes not less than the rotational angle φc used as the threshold at a plurality of mass points, the minimum unit time Δti is applied. The amount of change Δφi is calculated according to the equation (7) in the same way for a newly calculated angle φi(t+Δti), and if the calculated amount of change Δφi is not less than the rotational angle φc used as the threshold, the same processing as that described above is repeated.

On the other hand, if the amount of change Δφi is less than the rotational angle φc used as the threshold in the step S19, the CPU 51 determines whether or not the real time period T has elapsed (step S50). If the real time period T has not elapsed, the CPU 51 returns to the step S12, and repeats the same processing. If the real time period T has elapsed, the CPU 51 terminates the present process.

On the other hand, if the CPU 51 has carried out the above described processing for all the mass points, the CPU 51 determines whether or not the real time period T has elapsed set in the step S11 has elapsed (step S50). If the real time period T has not elapsed, the CPU 51 returns to the step S12, and carries out the same processing. On the other hand, the real time period T has elapsed, the CPU 51 terminates the present process. Although in the present embodiment, the Euler time integration method is used for the series of calculations of the physical quantities in the steps S13 to S16 carried out every unit time Δt, other time integration methods such as the Kutta-Merson method, the Newmark-β method, and the Willson-θ method may be used.

Figure 27:
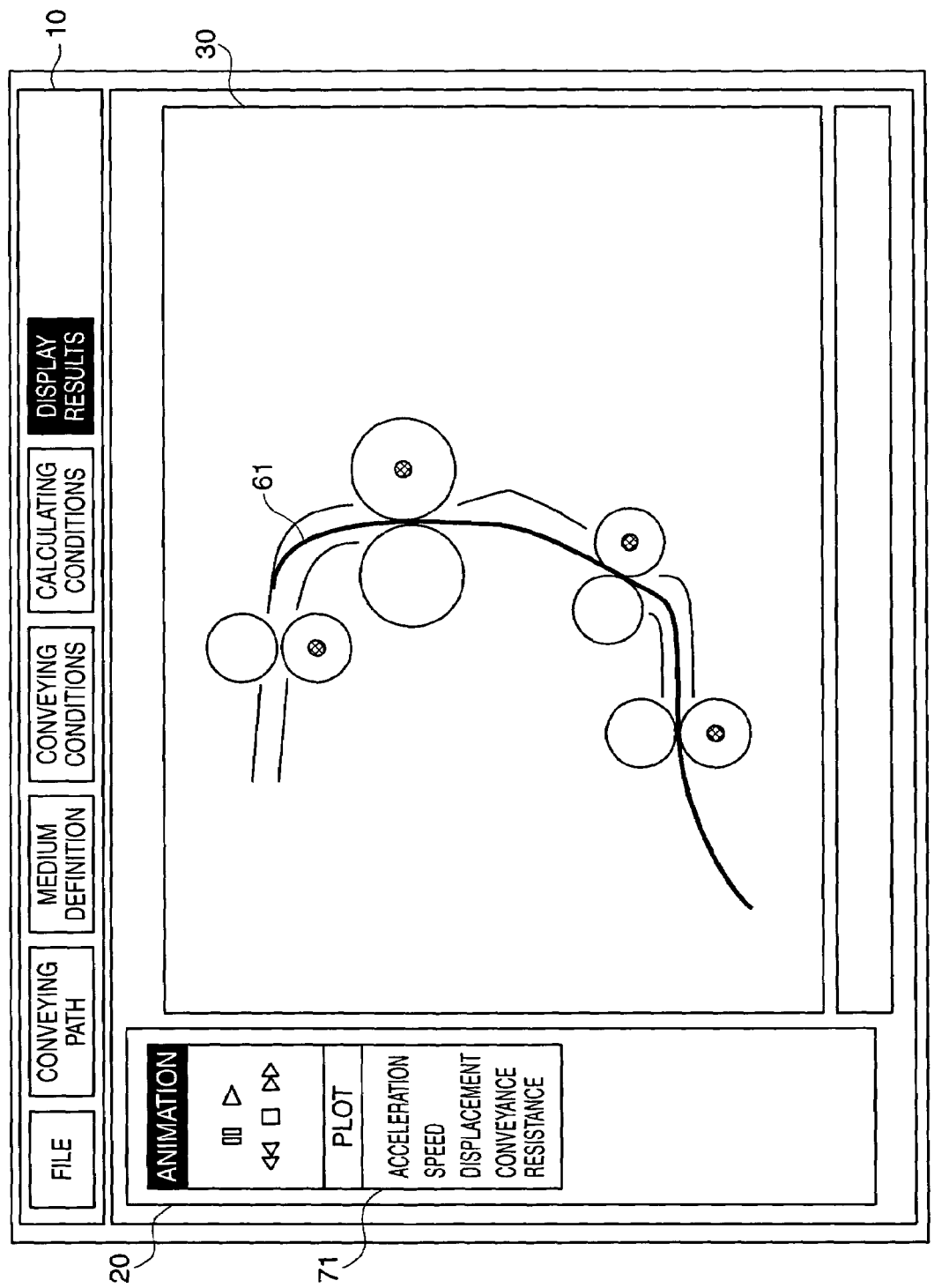
FIG. 27 is a view showing a screen for visualizing the behavior and area of the flexible medium when the rotational angle is not less than the rotational angle $\phi c$ used as the threshold.
Figure 28:
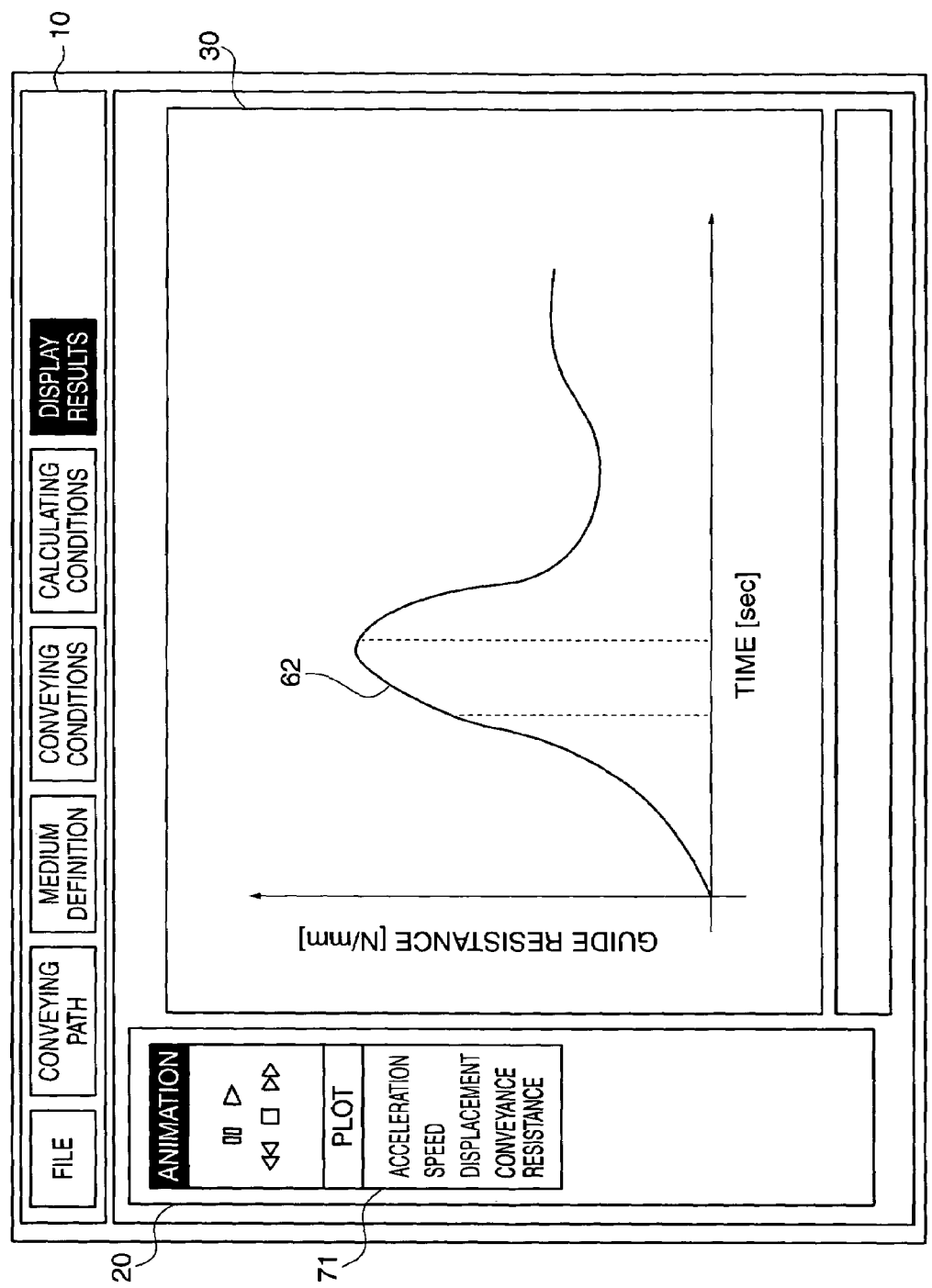
FIG. 28 is a view showing a screen for displaying a time region related to the flexible medium where the rotational angle is not less than the angle $\phi c$ used as the threshold.

FIG. 27 is a view showing a screen for visualizing the behavior and area of the flexible medium when the rotational angle is not less than the angle φc used as the threshold in the step S19 in FIG. 17B. FIG. 28 is a view showing a screen for displaying time region related to the flexible medium where the rotational angle is not less than the angle φc used as the threshold in the step S19 in FIG. 17B.

By operating an animation menu 71, the behavior of the flexible medium can be visualized on the graphic screen 30. During an operation of replaying an animation or the like, if the rotational angle becomes not less than the threshold φc, namely, a large deformation effect occurs, an area corresponding to the large deformation effect is displayed on the graphic screen 30. Moreover, in the present embodiment, the area 61 with the rotational angle not less than the threshold φc is displayed in a color different from the other areas. Further, if the rotational angle is not less than the threshold φc, a message "Large deflection" may be displayed. Still further, when the behavior of the flexible medium is quantitatively evaluated, a time region in which such a large deformation effect has occurred is displayed in the form of a graph. In the present embodiment, the time region 62 with the rotational angle not less than the threshold φc is displayed in a color different from the other areas.

In this way, the user can visually check the behavior of the flexible medium upon occurrence of a large deflection thereof, as well as the area and time region of the large deflection. As a result, the user can readily confirm the acceptability of the calculation result, and can evaluate the result. Moreover, if a large bend occurs in the flexible medium, which lasts less than the unit time Δt due to contact of the flexible medium with a guide having a large curvature, for example, handling of the behavior of the flexible medium may be enabled within the scope of the infinitesimal deformation theory so that the flexural rigidity of the flexible medium can be properly handled.

Figure 18:
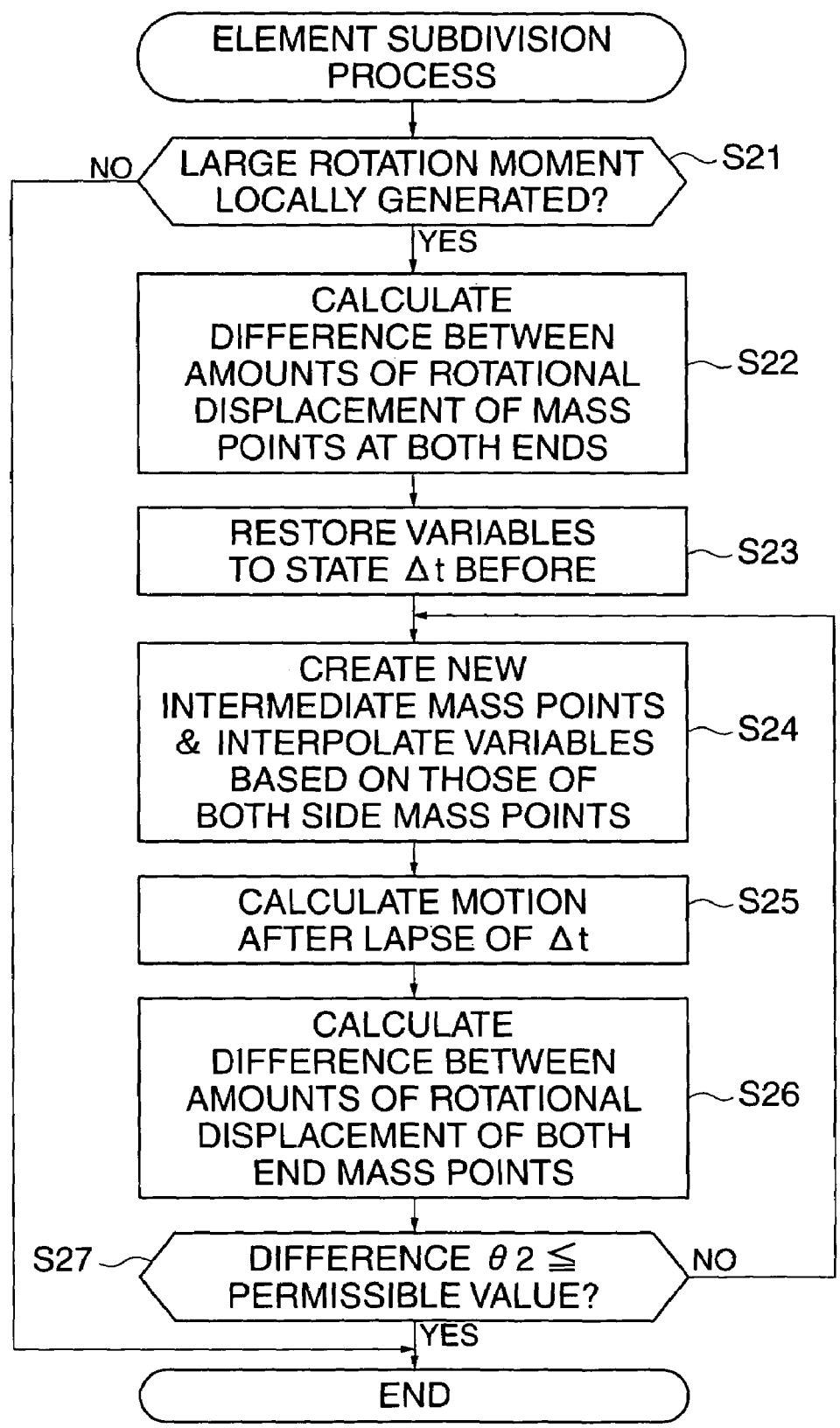
FIG. 18 is a flowchart showing the procedure of an element subdivision process in a step S6 appearing in FIG. 4 carried out by an element subdividing section appearing in FIG. 1.

FIG. 18 is a flowchart showing the procedure of an element subdivision process in the step S6 in FIG. 4 carried out by the element subdividing section 6 in FIG. 1.

First, the CPU 51 refers to the rotation moments at the respective mass points calculated by the motion calculating section 5 to determine whether or not a large rotation moment has been locally generated on the flexible medium (step S21). Specifically, the CPU 51 determines whether or not the condition of an equation (9) is satisfied, where L, M, ΔLi, and Mi represent the overall length of the flexible medium, the total rotation moment applied to the flexible medium, the interval to the next mass point of a certain mass point i, and the rotation moment at the mass point i, respectively. If the condition of the equation (9) is satisfied, the CPU 51 determines that a large rotation moment has been locally generated, and proceeds to the next step S22. On the other hand, if the condition of the equation (9) is not satisfied, the present process is terminated.

$$\sum_{i}^{i+n} \frac{\Delta L_i}{L} \sum_{i}^{i+n} \frac{M_i}{M} > 0.5 \qquad (9)$$

The left side of the equation (9) consists of the product of a term obtained by dividing the distance over which n successive mass points are arranged by the overall length L of the flexible medium, and a term obtained by dividing the sum of the rotation moments of the n successive mass points by the total rotation moment M. If the value of this product exceeds 0.5, the CPU 51 determines that a large local moment has been generated. The value of n is usually "5" to "10", and n=5 in the present embodiment.

Figure 19:
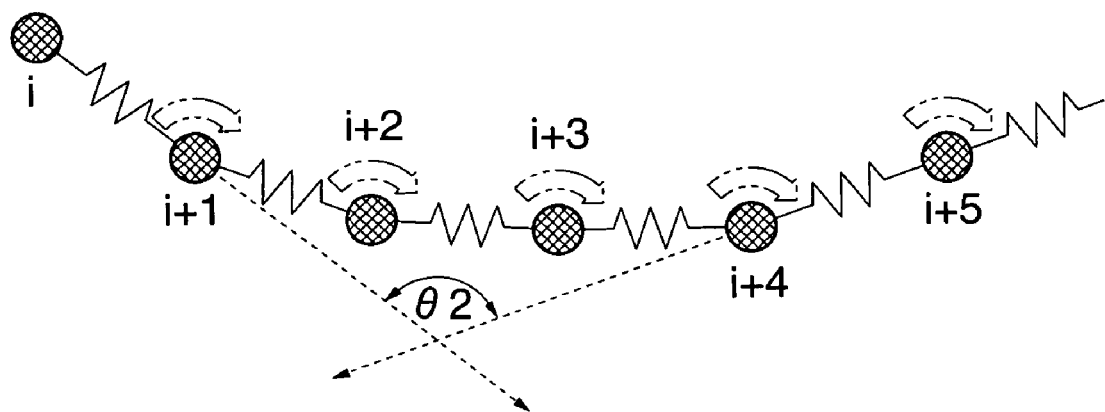
FIG. 19 is a view showing a difference between amounts of rotational displacement of mass points.

FIG. 19 is a view showing a difference between amounts of rotational displacement of mass points. The CPU 51 calculates and stores the respective rotational angles of the flexible medium at mass points i and i+5 at the both ends thereof (step S22). The acceleration, speed, and displacement as information on the respective mass points are once restored to respective values in the state the unit time Δt before (step S23). The CPU 51 subdivides the portion of the flexible medium where the rotation moment has been extracted in the step S21, and creates new mass points between the mass points i to i+5 (step S24).

Figure 20:
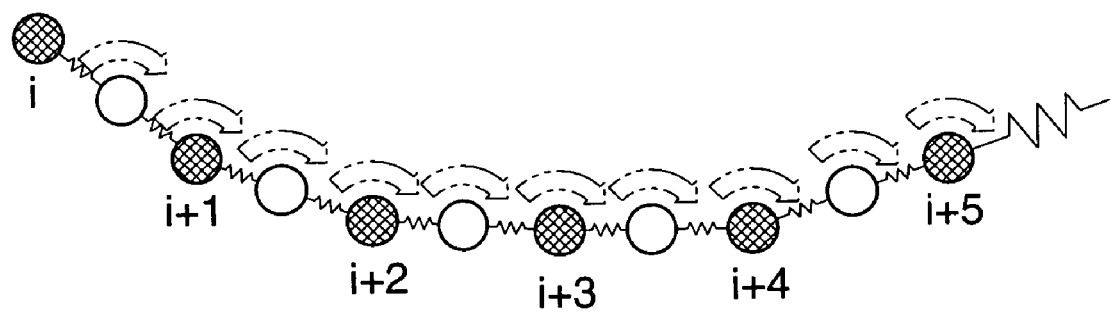
FIG. 20 is a view showing intermediate mass points which have been newly created.

FIG. 20 is a view showing the intermediate mass points which have been newly created. In FIG. 20, void mass points represent the intermediate mass points which have been newly created. At the same time, the intervals between the mass points are changed, and hence the mass, and rotational spring constant and translational spring constant of the respective mass points are set to half. Moreover, as physical quantities j which are related to the new mass points and required for calculation according to the motion equation, the averages of those of the mass points on the both sides of the respective new mass points are used. The motion after the lapse of the unit time Δt is calculated by the time integration for the subdivided model of the flexible medium (step S25).

The CPU 51 calculates and stores the respective rotational angles of the flexible medium at mass points i and i+5 at the both ends thereof in the same manner as in the step S22 (step S26). The CPU 51 obtains the difference θ2 between the rotational angles calculated in the steps S22 and S26 to determine whether or not the difference θ2 is not more than an allowable value (10 degrees) (step S27). If the difference θ2 between the rotational angles is not more than 10 degrees, the present process is terminated. On the other hand, if the difference θ2 is larger than 10 degrees, the CPU 51 returns to the step S24 to repeat the subdivision process.

[Result Display Section]

The result display section 7 carries out processing in response to the result display button 15 in the menu bar 10 being clicked, and displays an animation menu item and a plot menu item on the animation menu 71 on the sub-configuration menu 20 at the same time.

As described above, according to the design support system of the present embodiment, when the functions of the conveying path is evaluated, it is possible to easily set a curling shape of a sheet as the flexible medium.

Moreover, since there is provided the function of dividing the flexible medium into rigid body elements at equal ratio intervals, it is possible to more finely divide one end of an area for which curling is set, even if the same number of mass-spring elements are set, as compared with the case of dividing at equal intervals. It is thus possible to save the labor required for the subdivision process carried out by the element subdividing section 6, to thereby obtain accurate calculation results of the contact resistance, the conveying speed, and so forth, particularly when the leading end comes into contact with a guide or a roller, with reduced burden.

It is to be understood that the present invention is not limited to the above described embodiment, but various variations thereof may be possible without departing from the spirit of the present invention. Moreover, the present invention may either be applied to a system composed of a plurality of apparatuses or to a single apparatus.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and the storage medium in which the program code is stored constitute the present invention.

Examples of the storage medium for supplying the program code include a ROM, a floppy (registered trademark) disk, a memory card such as a PCMCIA card and a compact flash (registered trademark), a hard disk, a micro DAT, a magnetic-optical disk, an optical disk such as a CD-ROM and a CD-R, a phase-change optical disk, a magnetic tape, and a nonvolatile memory card. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Applications Nos. 2004-166336 filed Jun. 3, 2004, 2005-071896 and 2005-071897 both filed Mar. 14, 2005, which are hereby incorporated by reference herein.

What is claimed is:

1. A simulation apparatus that simulates a behavior of a flexible medium conveyed in a conveying path, comprising:
   a display device that displays at least one component in the conveying path defined in advance on a display screen; and
   a flexible medium setting device that interactively sets a shape of the flexible medium and an amount of curling of the flexible medium, the behavior of which is in the conveying path is simulated on the display screen on which the component is displayed by said display device.

2. A simulation apparatus according to claim 1, wherein said flexible medium setting device expresses the flexible medium as an elastic body model by dividing the flexible medium into a plurality of rigid body elements having mass, and connecting the rigid body elements by springs, said flexible medium setting device designating two of the plurality of rigid body elements to set a curled portion of the flexible medium.

3. A simulation apparatus according to claim 1, further comprising:
   a simulation device that simulates the behavior of the flexible medium set by said flexible medium setting device; and
   wherein when the shape of the flexible medium set by said flexible medium setting device is a straight shape, said simulation device causes a restoring force to act upon a portion of the flexible medium for which the shape of the flexible medium has been set by said flexible medium setting device so as to restore the curling shape of the flexible medium, upon start of the simulation.

4. A simulation apparatus according to claim 1, further comprising:
   a simulation device that simulates the behavior of the flexible medium set by said flexible medium setting device; and
   wherein when the shape of the flexible medium set by said flexible medium setting device includes a curved shape, said simulation device causes a restoring force to act upon a curled portion of the flexible medium for which the shape of the flexible medium has been set by said flexible medium setting device so as to restore the curling shape of the flexible medium and causes a restoring force to act upon a portion of the flexible medium other than the curled portion so as to restore a straight shape of the flexible medium, upon start of the simulation.

5. A simulation apparatus according to claim 1, wherein said display device displays a window for setting a length and a height of a curled portion of the flexible medium as the amount of curling of the flexible medium, according to designation of an end point of the flexible medium displayed by said display device.

6. A simulation method for a simulation apparatus that simulates a behavior of a flexible medium conveyed in a conveying path, comprising:

a display step of displaying at least one component in the conveying path defined in advance on a display screen;

a flexible medium shape step of setting a shape of the flexible medium, the behavior of which in the conveying path is simulated on the display screen on which the component displayed in said display step; and a flexible medium curling amount step of interactively setting an amount of curling of the flexible medium the shape of which has been set in said flexible medium shape setting step.

7. A simulation method according to claim 6, wherein in said flexible medium amount setting step, the flexible medium is divided into a plurality of rigid body elements having mass, and the rigid body elements are connected by springs, to thereby express the flexible medium as an elastic body model, and two of the plurality of rigid body elements are designated to set a curled portion of the flexible medium.

8. A simulation method according to claim 6, further comprising:

a simulation step of simulating the behavior of the flexible medium set in said flexible medium shape setting step and said flexible medium curling amount setting step; and wherein when the shape of the flexible medium set in said flexible medium shape setting step is a straight shape, in said simulation step, a restoring force is caused to act upon a portion of the flexible medium for which the shape of the flexible medium has been set in said flexible medium shape setting step so as to restore the curling shape of the flexible medium, upon start of the simulation.

9. A simulation method according to claim 6, further comprising:

a simulation step of simulating the behavior of the flexible medium set in said flexible medium shape setting step and said flexible medium curling amount setting step; and wherein when the shape of the flexible medium set in said flexible medium shape setting step includes a curved shape, in said simulation step, a restoring force is caused to act upon a curled portion of the flexible medium for which the shape of the flexible medium has been set in said flexible medium shape setting step so as to restore the curling shape of the flexible medium and causes a restoring force to act upon a portion of the flexible medium other than the curled portion so as to restore a straight shape of the flexible medium, upon start of the simulation.

10. A simulation method according to claim 6, wherein in said display step, a window is displayed for setting a length and a height of a curled portion of the flexible medium as the amount of curling of the flexible medium, according to designation of an end point of the flexible medium displayed in said display step.

11. A computer-readable simulation program for causing a computer to execute a simulation method for a simulation apparatus that simulates a behavior of a flexible medium conveyed in a conveying path, the simulation method comprising:

a display step of displaying at least one component in the conveying path defined in advance on a display screen;

a flexible medium shape step of setting a shape of the flexible medium, the behavior of which in the conveying path is simulated on the display screen on which the component displayed in said display step; and a flexible medium curling amount step of interactively setting an amount of curling of the flexible medium the shape of which has been set in said flexible medium shape setting step.

12. A simulation program according to claim 11, wherein in said flexible medium amount setting step, the flexible medium is divided into a plurality of rigid body elements having mass, and the rigid body elements are connected by springs, to thereby express the flexible medium as an elastic body model, and two of the plurality of rigid body elements are designated to set a curled portion of the flexible medium.

13. A simulation program according to claim 11, wherein the simulation method further comprises:

a simulation step of simulating the behavior of the flexible medium set in said flexible medium shape setting step and said flexible medium curling amount setting step; and wherein when the shape of the flexible medium set in said flexible medium shape setting step is a straight shape, in said simulation step, a restoring force is caused to act upon a portion of the flexible medium for which the shape of the flexible medium has been set in said flexible medium shape setting step so as to restore the curling shape of the flexible medium, upon start of the simulation.

14. A simulation program according to claim 11, wherein the simulation method further comprises:

a simulation step of simulating the behavior of the flexible medium set in said flexible medium shape setting step and said flexible medium curling amount setting step; and wherein when the shape of the flexible medium set in said flexible medium shape setting step includes a curved shape, in said simulation step, a restoring force is caused to act upon a curled portion of the flexible medium for which the shape of the flexible medium has been set in said flexible medium shape setting step so as to restore the curling shape of the flexible medium and causes a restoring force to act upon a portion of the flexible medium other than the curled portion so as to restore a straight shape of the flexible medium, upon start of the simulation.

15. A simulation program according to claim 11, wherein In said display step, a window is displayed for setting a length and a height of a curled portion of the flexible medium as the amount of curling of the flexible medium, according to designation of an end point of the flexible medium displayed in said display step.

* * * * *